US012768996B2

(12) United States Patent
Nielsen et al.

(10) Patent No.: US 12,768,996 B2
(45) Date of Patent: Oct. 20, 2026

(54) SENSOR

(71) Applicant: AUCKLAND UNISERVICES LIMITED, Auckland (NZ)

(72) Inventors: Poul Michael Fonss Nielsen, Auckland (NZ); Mojtaba Shahmohammadi, Auckland (NZ); Minas Liarokapis, Auckland (NZ)

(73) Assignee: AUCKLAND UNISERVICES LIMITED, Auckland (NZ)

( * ) Notice: Subject to any disclaimer, the term of this patent is extended or adjusted under 35 U.S.C. 154(b) by 67 days.

(21) Appl. No.: 18/704,726

(22) PCT Filed: Oct. 27, 2022

(86) PCT No.: PCT/IB2022/060357

§ 371 (c)(1),
(2) Date: Apr. 25, 2024

(87) PCT Pub. No.: WO2023/073617

PCT Pub. Date: May 4, 2023

(65) Prior Publication Data

US 2025/0035786 A1 Jan. 30, 2025

Related U.S. Application Data

(60) Provisional application No. 63/272,669, filed on Oct. 27, 2021.

(51) Int. Cl.
*G01S 17/58* (2006.01)
*G01S 17/88* (2006.01)

(52) U.S. Cl.
CPC .............. *G01S 17/58* (2013.01); *G01S 17/88* (2013.01)

(58) Field of Classification Search
CPC .......... G01S 17/04; G01S 17/58; G01S 17/88; A61B 5/0064; A61B 5/441
See application file for complete search history.

(56) References Cited

U.S. PATENT DOCUMENTS 11,185,279 B2 * 11/2021 Talgorn ................ A61B 5/4839
2015/0011894 A1 1/2015 Sarrafzadeh et al.
(Continued)

FOREIGN PATENT DOCUMENTS

CN 106073774 A 11/2016

OTHER PUBLICATIONS

Cen et al., "Optical Muscle Activation Sensors for Estimating Upper Limb Force Level," IEEE International Instrumentation and Measurement Technology Conference, 2011, 4 pages.
(Continued)

*Primary Examiner* — Kevin K Pyo
(74) *Attorney, Agent, or Firm* — Orrick, Herrington & Sutcliffe LLP

(57) ABSTRACT

A sensor device is provided. The sensor device includes an elastic light-transmissive layer with an optical property that changes in response to deformation. First and second light sources emit respective first and second incident lights towards the skin surface of a user, with the first incident light emitted through the layer. A photodetector detects first and second reflected lights reflected from different skin depths. The sensor device may be used to detect subcutaneous tissue movements. One or more sensor devices and a model generated from sensed data, associated with different muscle states or physical positions of a user may be used to estimate a physical position or movement of a body part of a user. Such estimated physical positions or movements may be used to operate other devices such as anthropomorphic robotics, actuated exoskeletons, and active prosthetic limbs.

14 Claims, 10 Drawing Sheets

(56) References Cited

U.S. PATENT DOCUMENTS

| | | | |
|---|---|---|---|
| 2016/0357265 | A1 | 12/2016 | Maani |
| 2017/0143208 | A1 | 5/2017 | Blank et al. |
| 2021/0381823 | A1 | 12/2021 | Kennedy et al. |

OTHER PUBLICATIONS

International Search Report and Written Opinion for International (PCT) Patent Application No. PCT/IB2022/060357, dated Dec. 21, 2022, 9 pages.
1 Extended European Search Report in EP22886283.5, mailed 2025-07-08, 21 pages.

* cited by examiner

| Data source | LMG | | | EMG | | |
|---|---|---|---|---|---|---|
| **Model** | **RF** | **CNN** | **TMC-ViT** | **RF** | **CNN** | **TMC-ViT** |
| **Subject 1** | 96.10±3.35 | 96.91±2.63 | 97.88±1.79 | 93.57±2.39 | 95.73±1.81 | 96.15±2.01 |
| **Subject 2** | 98.68±0.49 | 98.88±0.37 | 99.11±0.39 | 97.07±1.16 | 96.04±1.21 | 97.87±0.38 |
| **Subject 3** | 96.31±1.83 | 97.46±1.70 | 97.98±0.71 | 94.83±2.52 | 96.40±1.63 | 97.64±0.27 |
| **Subject 4** | 96.56±0.56 | 96.51±0.87 | 97.50±0.37 | 94.01±3.00 | 95.95±1.62 | 96.18±1.14 |
| **Subject 5** | 95.56±1.29 | 96.13±0.79 | 96.85±0.49 | 98.24±0.85 | 98.27±0.56 | 98.03±0.54 |
| **Average** | **96.64±1.19** | **97.18±1.07** | **97.86±0.82** | **95.54±2.02** | **96.48±1.10** | **97.17±0.93** |

| Model | RF | | CNN | | TMC-ViT | |
|---|---|---|---|---|---|---|
| Subject | C | A | C | A | C | A |
| Subject 1 | 89.82±3.45 | 78.14±5.52 | 95.52± 2.36 | 89.79±4.22 | 96.16±3.66 | 92.32±6.72 |
| Subject 2 | 83.27±5.39 | 56.87±25.79 | 94.18±4.60 | 88.03±8.00 | 95.52±3.99 | 88.08±8.51 |
| Subject 3 | 82.89±11.7 | 71.71±16.12 | 89.68±4.39 | 78.40±6.47 | 92.22±4.14 | 83.34±8.10 |
| Subject 4 | 94.51±4.11 | 87.02±3.72 | 96.90±1.21 | 91.40±3.05 | 96.96±0.74 | 92.43±3.33 |
| Subject 5 | 79.45±8.40 | 62.96±62.96 | 83.01±6.51 | 72.19±7.88 | 89.88±4.59 | 74.06±5.89 |
| **Average** | **85.99±6.06** | **71.64±11.52** | **91.86±5.65** | **83.96±8.30** | **93.55±4.14** | **86.05±7.67** |

SENSOR

CROSS REFERENCE TO RELATED APPLICATIONS

This application is a national stage application under 35 U.S.C. 371 and claims the benefit of PCT Application No. PCT/IB2022/060357 having an international filing date of 27 Oct. 2022, which designated the United States, and which PCT application claimed the benefit of U.S. Provisional Application No. 63/272,669 filed 27 Oct. 2021, the contents of each of which are incorporated herein by reference in their entireties.

FIELD OF TECHNOLOGY

The present invention relates to sensor devices for use in detecting subcutaneous tissue movement from a skin surface, and more particularly but not solely to a sensor and combinations of sensors for use in estimating physical positions or movements of a user and controlling robotic devices based on the estimated positions or movements.

BACKGROUND

The following includes information that may be useful in understanding the present inventions. It is not an admission that any of the information provided herein is prior art, or relevant, to the presently described or claimed inventions, or that any publication or document that is specifically or implicitly referenced is prior art. Any discussion of the prior art throughout the specification should in no way be considered as an admission that such prior art is widely known or forms part of the common general knowledge in the field.

Human-machine interfaces transform user inputs into machine actionable outputs. Conventional machine controls rely on conscious human interactions. Examples of conscious control interfaces include keyboards, joysticks, and touch screen displays. In contrast, innate machine interfaces translate physiological outputs into a form that can be used for machine control. For example, electromyography (EMG) interfaces measure electrical activation patterns in skeletal muscle that are representative of muscle movement. The electrical signals obtained from electromyography (EMG) measurements can be processed to distinguish and/or estimate different types of movement and identify user intentions. Where non-invasive sensing is desired, surface electromyography (sEMG) may be utilised. sEMG interfaces may require complex electronics for data acquisition and processing and may require precise placement of gel-based electrodes to obtain accurate data. The efficacy of gel-based electrodes may be susceptible to moisture.

Forcemyography (FMG) interfaces may also be used to capture the pressure from muscle contractions to try to identify a user's movement, such as the hand gestures or various types of grip assumed by a user's hand. Because accurately placed gel-based electrodes are not required, a FMG interfaces may be less prone to inaccuracy of placement of the interface and to moisture. However, as FMG interfaces do not detect muscle activation direction, but rather do so based on sensed muscle volume changes, their accuracy may be limited.

Another form of interface that may be utilised are electroencephalography (EEG) interfaces, for example configured as helmet or other wearable.

Vision-based systems may also be used to try to identify a user's movement. Vision-based systems may be susceptible to occlusion or changes in lighting and may require very significant training in order to provide suitable accuracy.

Innate machine interfaces can interpret user intent without conscious user interaction. They can also be more intuitive than conventional controls when a machine is mimicking human movements. This makes them well suited for applications where conscious interaction with a machine is disadvantageous. Anthropomorphic robotics, actuated exoskeletons and active prosthetic limbs are some examples where innate machine interfaces can be used. For instance, an electromyography (EMG) interface can sense electrical activation of the muscles in a user's forearm (muscles that are responsible for hand gestures and/or various type of grip) and generate a control output for a grasping device (such as a robotic gripper, actuated prosthetic hand or exoskeleton glove). There are similar examples for devices that mimic lower limbs and other appendages.

Robotic grippers, actuated prosthetic hands and exoskeleton gloves are examples of soft robotic grasping devices that attempt to replicate, assist, or enhance human manipulation and/or grip. Robotic grippers have been developed for a diverse range of applications, including fruit picking, vehicle assembly and material handling. There are two basic robotic gripper categories: vacuum grippers and actuated grippers (such as pneumatic, hydraulic, and servo-electric grippers). Some actuated gripping systems can be used for other applications, such as prosthetic hands and grip augmenting gloves, where there is a tendency to mimic anthropomorphic features (i.e. humanlike characteristics).

Actuated prosthetic hands are intended to restore the form and function of a human hand. A partial hand prosthesis is used where the recipient has lost one or more fingers. A complete prosthesis is used when the recipient has lost an entire hand. Both types of prosthesis interface with the recipient in some way to translate the recipient's intentions into finger and/or hand movements. This can be achieved with mechanical systems that transfer force from another part of the recipient's body to the prosthesis (i.e. a body powered prosthesis), or via sensors (e.g. electromyography (EMG) sensors that control motorised systems).

Grip augmenting gloves are used to enhance the functionality of a recipient's hand. The gloves can be used to increase fatigue tolerance for demanding gripping tasks (e.g. repetitive or heavy work), help with rehabilitation (e.g. for stroke patients) and improve long term mobility and/or strength for recipients that suffer from degenerative neurological and/or musculoskeletal diseases (e.g. arthritis, Cerebral Palsy and Parkinson's Disease). These devices usually comprise artificial tendons (e.g. cable or pneumatic/hydraulic lines) that extend from some form of actuator to the fingertips of a glove. Actuation of the actuator pulls the fingers toward the palm of the hand, replicating the recipient's natural grip.

The form and function of a grasping device is often defined by its intended application. For example, grasping devices that are intended to replace or augment human hands are expected to be wearable (e.g. battery powered, lightweight and appropriately sized for the recipient), whereas grippers that are used for industrial assembly lines will often prioritise grasping and/or lifting force.

INCORPORATION BY REFERENCE

The U.S. provisional patent application with Application No. 63/272,669 titled "A SENSOR", filed on 27 Oct. 2021 is hereby incorporated by reference in its entirety, meaning the Specification, Indicative Claims, Drawings, Annex 1, and Annex 2, should be considered part of the incorporated disclosure.

SUMMARY

It is an object of the invention provide an improved sensor device which addresses or ameliorates one or more disadvantages or limitations associated with the prior art, or at least to provide the public with a useful choice.

In a first aspect, the disclosure provides a sensor device for detecting subcutaneous tissue movement from a skin surface of a user, the sensor device comprising:

- an elastic light-transmissive layer having an optical property that changes in response to deformation of the light-transmissive layer,
- a first light source configured to emit a first incident light through the light-transmissive layer towards the skin surface,
- a second light source configured to emit a second incident light towards the skin surface, and
- a photodetector configured to detect a first reflected light, which represents a reflection of the first incident light by a cutaneous tissue layer or at or adjacent a skin surface, and a second reflected light, which represents a reflection of the second incident light by a subcutaneous tissue layer.

The photodetector is provided on the light-transmissive layer to detect the first reflected light and second reflected light through the light-transmissive layer.

At least a portion of a side of the light-transmissive layer that is configured to contact the skin surface of the user is reflective and configured to reflect light of the first incident light.

The first light source is provided on the light-transmissive layer to emit the first incident light through the light-transmissive layer.

The light transmissive layer has a thickness of about 5 mm between the side of the light-transmissive layer that is configured to contact the skin surface of the user and an opposed side at which the first light source is provided, whereby an intensity of the detected first reflection light is increased.

The second light source is provided on the skin surface of the user and configured to emit the second incident light directly through the skin surface of the user.

The light-transmissive layer, first light source, second light source, and photodetector define a sensor module, and the sensor device comprises a plurality of sensor module, each sensor module for use in detecting subcutaneous tissue movement associated with a different muscle group of the user.

The first incident light has a first wavelength, the second incident light has a second wavelength, and the first wavelength is shorter than the second wavelength.

The first wavelength ranges from about 500 nm to about 565 nm, and the second wavelength ranges from about 625 nm to about 1,400 nm.

The light-transmissive layer is configured to resiliently deform, and a deformation of the light-transmissive layer affects one of a path and an intensity of light traversing through the light-transmissive layer.

The first and second light sources are configured to non-contemporaneously emit the respective first and second incident lights towards the skin surface of the user.

The sensor device further comprises at least one of:

- a band configured to apply a bias force on the light-transmissive layer against the skin surface of the user, and
- a processor configured to estimate a subcutaneous tissue movement based on the detected first reflected light and second reflected light.

The processor is configured to provide values of the detected first reflected light and second reflected light as inputs to a model, and from an output of the model to determine a gestural condition of a body part of the user.

The first reflected light represents a reflection of the first incident light by a cutaneous tissue layer of tissue, and the cutaneous layer is an epidermis layer.

In another aspect, the disclosure provides a method of estimating a muscular contraction state of a target muscle using a sensor device as described herein, the method comprising the steps of:

- receiving, using a processor, a sensed value of each of the first reflected light and second reflected light at both a first time point and a second time point,
- estimating, using the processor, a deformation of a cutaneous region adjacent the skin of a user based on a change in the sensed value of the first reflected light,
- estimating, using the processor, a deformation of a subcutaneous region adjacent the cutaneous region of the user based on a change in the sensed value of the second reflected light, and
- estimating, using the processor, muscular contraction state of the target muscle based on the estimated cutaneous deformation and estimated subcutaneous deformation.

The foregoing steps are repeated at different times to provide multiple temporal estimates of the muscular contraction state of the target muscle, and wherein the multiple temporal estimates of muscular contraction state are used to infer a gestural movement of a body part of the user associated with the target muscle.

In another aspect, the disclosure provides a sensor device comprising:

- a light-transmissive layer elastically deformable to cause a corresponding change in an optical characteristic of light traversing through the light-transmissive layer;
- a first light emitting component configured to emit light through the light-transmissive layer towards a skin site for reflection by a corresponding epidermis skin portion;
- a second light emitting component configured to emit light towards the skin site for reflection by a corresponding non-epidermis skin portion; and
- a photodetector configured to detect light reflected by the epidermis and non-epidermis skin portions.

The non-epidermis skin portion is a subcutaneous tissue portion.

The light-transmissive layer is adapted to be arranged on the skin site and is configured to space the first light emitting component apart from the skin site by 5 mm, whereby light reflected by the epidermis skin portion and detected by the photodetector is increased in intensity.

The photodetector is configured to detect the reflected light via the light-transmissive layer.

In another aspect of the disclosure, a method is provided. The method comprises estimating subcutaneous tissue movement from a composite light measurement, wherein the composite light measurement comprises light of a first wavelength reflected from the surface of the skin, and light of a second wavelength reflected from subcutaneous tissue beneath the surface of the skin.

In another aspect of the disclosure, a sensor is provided. The sensor comprises:

a first light source, wherein the first light source is configured to sit on or adjacent the skin of a recipient and direct incident light of a first wavelength through at least the upper layers of the recipient's skin, a second light source, wherein the second light source is configured direct incident light of a second wavelength onto the recipient's skin at a location near the first light source, a compliant pad made from a transparent or translucent elastomer, wherein the compliant pad is configured to sit between the second light source and the skin of the recipient, and at least one photodetector, wherein the at least one photodetector is configured to receive light reflected from the skin and/or subcutaneous tissue of the recipient, and measure an intensity of light at the first wavelength and an intensity of light at the second wavelength.

In another aspect of the disclosure, a method is provided. The method comprises:

obtaining a first deformation measurement, wherein the first deformation measurement represents deformation of an epidermis layer of the skin, obtaining a second deformation measurement, wherein the second deformation measurement represents deformation of a dermis layer of the skin that is in close proximity to the epidermis layer represented in the first deformation measurement, and combining the first deformation measurement and the second deformation measurement to produce an estimate of subcutaneous tissue movement.

In another aspect of the disclosure, a belt is provided. The belt comprises a first light sensor that is configured to detect displacement of skin under the belt, and a second light sensor that is configured to detect displacement of soft tissue below the skin surface.

In another aspect of the disclosure, a device is provided. The device comprises a strap with a first light sensor that is disposed adjacent an inner surface of the strap, and a second light sensor that is spaced circumferentially from the first light sensor, wherein the second light sensor is offset outwardly from the inner surface of the strap compared to the first light sensor, and the strap comprises a compressible elastomeric pad that is disposed between the second light sensor and the inner surface of the strap.

In another aspect of the disclosure, a band is provided. The band comprises at least two light sensors that are configured to detect displacement of soft tissue in close proximity to the band, wherein the at least two light sensors operate in different frequency ranges of the light spectrum, and the band is configured to position the at least two light sensors at different distances from the skin.

In another aspect, the disclosure provides a method comprising estimating subcutaneous tissue movement from a composite light measurement, wherein the composite light measurement comprises light of a first wavelength reflected from the surface of the skin, and light of a second wavelength reflected from subcutaneous tissue beneath the surface of the skin.

The method comprises obtaining a deformation estimate for an epidermis layer of the skin from an intensity of light captured at the first wavelength, and obtaining a deformation estimate for a dermis layer of the skin from an intensity of light captured at the second wavelength.

The method comprises combining the deformation estimates for the epidermis layer and the dermis layer of the skin to create an estimate of subcutaneous tissue movement.

The method comprises calculating an estimate of muscle and/or tendon contraction from the intensity of light at the first wavelength and the intensity of light at the second wavelength present in the composite light measurement.

The method comprises actuating an artificial limb responsive to the calculated estimate of muscle contraction.

The method comprises:

making light from the first light source incident on the surface of the skin for a first time period, and concurrently measuring the intensity of light reflected from the surface of the skin with a photodetector, and making light from the second light source incident on the surface of the skin for a second time period, and concurrently measuring the intensity of light reflected from the subcutaneous tissue with the photodetector, wherein the first time period and the second time period are not contemporaneous.

In another aspect, the disclosure provides a sensor comprising:

a first light source, wherein the first light source is configured to sit on or adjacent the skin of a recipient and direct incident light of a first wavelength through at least the upper layers of the recipient's skin, a second light source, wherein the second light source is configured direct incident light of a second wavelength onto the recipient's skin at a location near the first light source, a compliant pad made from a transparent or translucent elastomer, wherein the compliant pad is configured to sit between the second light source and the skin of the recipient, and at least one photodetector, wherein the at least one photodetector is configured to receive light reflected from the skin and/or subcutaneous tissue of the recipient, and measure an intensity of light at the first wavelength and an intensity of light at the second wavelength.

The sensor comprises a band, the band holds the first light source, the second light source, the compliant pad and the at least one photodetector in proximity to the skin, and the band is configured to pre-load the compliant pad against the skin of the recipient by applying pressure to the recipient's skin.

The band is configured to circumscribe a limb of the recipient.

The compliant pad is configured to channel light from the second light source to the skin of the recipient.

The compliant pad is configured to absorb a variable amount of light at the second wavelength as the pad is compressed, and the amount of light that the compliant pad absorbs is dependent on the deformation of the elastomer.

A second light source has a wavelength that is greater than 650 nm, and the first light source has a wavelength that is less than 550 nm.

In another aspect, the disclosure provides a method comprising:

obtaining a first deformation measurement, wherein the first deformation measurement represents deformation of an epidermis layer of the skin, obtaining a second deformation measurement, wherein the second deformation measurement represents deformation of n dermis layer of the skin that is in close proximity to the epidermis layer represented in the first deformation measurement, and combining the first deformation measurement and the second deformation measurement to produce an estimate of subcutaneous tissue movement.

the method comprises estimating the first deformation measurement from an intensity of light reflected from the skin at a first wavelength, and estimating the second deformation measurement from an intensity of light reflected from the skin at a second wavelength.

The method comprises interleaving light from a first light source, that emits light at the first wavelength, with light from a second light source, that emits light at the second wavelength, and measuring the intensity of light from the first light source and the intensity of light from the second light source with a single photodetector.

In another aspect, the disclosure provides a belt comprising first light sensor that is configured to detect displacement of skin under the belt, and a second light sensor that is configured to detect displacement of soft tissue below the skin surface.

The first light sensor is held above the surface of the skin and operates with a wavelength that is between 625 nm and 1 mm, and the second light sensor is held adjacent the skin and operates with a wavelength between 10 nm and 565 nm.

In another aspect, the disclosure provides a device comprising a strap with a first light sensor that is disposed adjacent an inner surface of the strap, and a second light sensor that is spaced circumferentially from the first light sensor, wherein the second light sensor is offset outwardly from the inner surface of the strap compared to the first light sensor, and the strap comprises a compressible elastomeric pad that is disposed between the second light sensor and the inner surface of the strap.

The second light sensor is displaced outwardly from an inner surface of the strap by more than 2 mm, and the elastomeric pad occupies the space between the second light source and the inner surface of the strap.

The first light sensor comprises a first light source with a first wavelength and a first photodetector, and the second light sensor comprises a second light source with a second wavelength and a second photodetector.

The strap is configured to apply a radially compressive force on a limb of a recipient that places the first light sensor in contact with, or immediately adjacent, the skin of the recipient.

In another aspect, the disclosure provides a band comprising at least two light sensors that are configured to detect displacement of soft tissue in close proximity to the band, wherein the at least two light sensors operate in different frequency ranges of the light spectrum, and the band is configured to position the at least two light sensors at different distances from the skin.

The band comprises a compliant elastomeric material that is disposed between a first of the at least two light sensors and an inner circumference of the band, and the compliant elastomeric material is configured to contact the skin and deform in response to movement of soft tissue immediately under the contacted skin.

The compliant elastomeric material contains a dopant, and the dopant is configured to alter the transmissibility of light, from the first of the at least two light sensors, through the compliant elastomeric material dependent on the deformation of the compliant elastomeric material.

The first of the at least two sensors is configured to measure deformation of the compliant elastomeric material as a proxy for displacement of soft tissue, and a second of the at least two sensors is positioned closer to the skin than the first of the at least two sensors, wherein the second of the at least two sensor is configured to measure displacement of soft tissue below the skin.

A first light sensor of the at least two light sensors comprises a red or infrared LED light source, and a second light sensor of the at least two light sensors comprises a green, blue, violet, or ultraviolet LED light source.

In another aspect, the disclosure provides a sensor device comprising: a light-transmissive layer elastically deformable to cause a corresponding change in an optical characteristic of light traversing through the light-transmissive layer; a first light emitting component configured to emit light through the light-transmissive layer towards a skin site for reflection by a corresponding epidermis skin portion; a second light emitting component configured to emit light towards the skin site for reflection by a corresponding non-epidermis skin portion; and a photodetector configured to detect light reflected by the epidermis and non-epidermis skin portions.

The photodetector may preferably be configured to detect the reflected light via the light-transmissive layer.

Preferably, the optical characteristic may comprise at least one of a path and an intensity.

It may be preferred that the light-transmissive layer may be adapted to be arranged on the skin site and may be configured to space the first light emitting component apart from the skin site by 5 mm, whereby light reflected by the epidermis skin portion and detected by the photodetector is increased in intensity.

The first and second light emitting components may be configured to alternatingly emit light.

The non-epidermis skin portion may be a subcutaneous tissue portion.

It may be preferred that sensor device may further comprise a reflective layer configured to reflect light, which is reflected by either one of the epidermis and non-epidermis skin portions and which is undetected by the photodetector, towards the skin site for reflection by the corresponding one of the epidermis and non-epidermis skin portions.

The sensor device may further comprise at least one of: a fastening component adapted to maintain contact of the light-transmissive layer with the skin site; and a processor configured to determine a subcutaneous tissue movement of the skin site based on light detected by the photodetector.

According to another aspect, the disclosure provides a method of determining a subcutaneous tissue movement, comprising: determining, using a processor, a deformation of an epidermis skin portion of a skin site based on light reflected by the epidermis skin portion and detected by a photodetector; determining, using the processor, a deformation of a non-epidermis skin portion of the skin site based on light reflected by the non-epidermis skin portion and detected by the photodetector; and determining, using the processor, a subcutaneous tissue movement based on the determined deformations.

According to another aspect, there is provided a method of determining a muscle movement, comprising: receiving feature data representing detections of light reflected by an epidermis skin layer and light reflected by a non-epidermis skin layer; and performing a regression operation on the feature data to determine a muscle movement.

Preferably, the received feature data may represent unprocessed data generated by at least one photodetector. Preferably, the received feature data may represent unprocessed photodetector data.

It is preferred that the regression operation may relate to one of a random forest (RF) process, a convolutional neural network (CNN) process, and a temporal multi-channel vision transformer (TMC-ViT) process.

Preferably, the method further comprises determining one of a gesture and a force based on the determined muscle movement.

In another aspect, the disclosure provides a method of determining a muscle movement, comprising: receiving feature data representing detections of light reflected by an epidermis skin layer and light reflected by a non-epidermis skin layer; and performing a regression operation on the feature data to determine a muscle movement.

It may be preferred that the received feature data represents unprocessed data generated by at least one photodetector.

The method may further comprise determining a gesture based on the determined muscle movement.

The term "and/or" can mean "and" or "or".

The terms "properties" and "characteristics" may be used interchangeably herein.

As used herein "(s)" following a noun means the plural and/or singular forms of the noun.

As used in this specification and claims, the words "comprise "comprises". "comprising", and similar words, are not to be interpreted in an exclusive or exhaustive sense. In other words, they are intended to mean "including, but not limited to When interpreting each statement in this specification that includes the term "comprise "comprises", or "comprising", features other than that or those prefaced by the term may also be present. "comprises", or "comprising", features other than that or those prefaced by the term may also be present.

The term "axis" as used in this specification means the axis of revolution about which a line or a plane may be revolved to form a symmetrical shape. For example, a line revolved around an axis of revolution will form a surface, while a plane revolved around an axis of revolution will form a solid.

For the purposes of this specification, the term "plastic" shall be construed to mean a general term for a wide range of synthetic or semisynthetic polymerization products, and generally consisting of a hydrocarbon-based polymer.

Any method detailed herein also corresponds to a disclosure of a device and/or system configured to execute one, or more, or all, of the method actions. Likewise, any disclosure of a device and/or system detailed herein corresponds to a method of making and/or using the device and/or system, including a method of using that device according to the functionality detailed herein. And any disclosure of a device and/or system detailed herein also corresponds to a disclosure of otherwise providing that device and/or system.

For the purpose of this specification and claims, where method steps are described in sequence, the sequence does not necessarily mean that the steps are to be chronologically ordered in that sequence, unless there is no other logical manner of interpreting the sequence.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

Aspects of the disclosure are provided by way of example only, and it should be appreciated that variations, modifications, and additions may be made without departing from the scope of the disclosure. Furthermore, where known equivalents exist to specific features, such equivalents are incorporated as if specifically referred in this specification. Thus, where herein reference is made to integers or components having known equivalents thereof, those integers are herein incorporated as if individually set forth.

The invention may also be said broadly to consist in the parts, elements and features referred to or indicated in the specification of the application, individually or collectively, in any or all combinations of two or more of said parts, elements or features.

Unless otherwise specified or otherwise not enabled by the art, any one or more teachings detailed herein with respect to one embodiment or example can be combined with one or more teachings of any other teaching detailed herein with respect to other embodiments or examples, and this includes the duplication or repetition of any given teaching of one component with any like component.

Some exemplary embodiments include the utilization of devices to implement some or all of the method actions detailed herein. In some exemplary embodiments, these devices include or otherwise are logic circuits or electronics devices, such as processors, which processors can include or otherwise can have access to memory components. Alternatively. and/or in addition to this, computer chips can be configured or otherwise programmed to execute one or more of the method actions detailed herein. In some embodiments, there is a system, comprising a processor and/or microchip or some form of electronic logic circuitry and/or a sensor configured to execute at least some of the method actions detailed herein. The logic circuitry can be part of or can be the laptop computer or other types of computer devices (desktop and/or server or mainframe) that can enable the teachings detailed herein that are programmed or otherwise configured to implement at least some of the method actions detailed herein. The computing device can be a smart phone or a smart device. And note that in some embodiments, some features are in wireless and/or wired communication with such computing devices.

Other aspects of the invention may become apparent from the following description which is given by way of example only and with reference to embodiments illustrated in the accompanying drawings.

BRIEF DESCRIPTION OF THE DRAWINGS

Embodiments are described with reference to the accompanying drawings, wherein.

DETAILED DESCRIPTION

Figure 1:
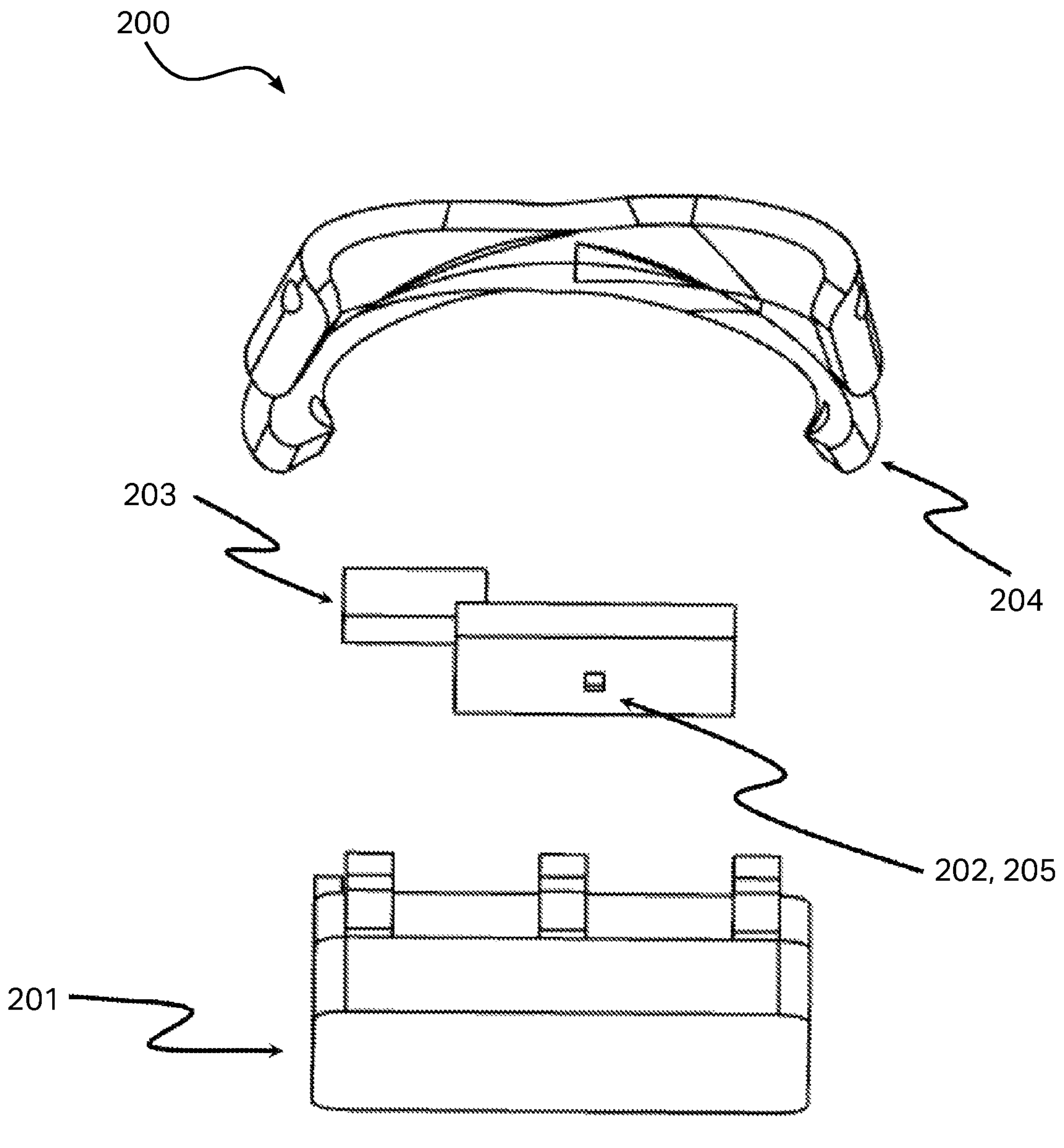
FIG. 1 is an exploded view of a multi-layer sensor module comprising two light sources of different wavelength and a single photodetector.

In one aspect, the disclosure provides for a sensor device. Elsewhere herein the sensor device may be referred to as a light sensor, or as a sensor module. The sensor device may be usable for detecting a physical state of tissue of a user, where the sensor device is located at or near a skin surface of the user. The sensor device is usable to detect a property of tissue of a user by light emission and the detection of reflected light. More particularly, in some examples the sensor device is usable to detect changes in a property or properties of tissue of a user over time by light emission and the detection of changes in reflected light.

The sensor device may include a plurality of light sources (e.g., light emitting components), each source to emit incident light for reflection by the tissue of the user, and a photodetector to detect the reflected light.

The light emitted by each light source may include one or more different wavelengths. For example, a first light source may emit light of a first wavelength or range of wavelengths, and a second light source may emit light of a second wavelength or range of wavelengths that is/are different to those of the first light source.

The user of the sensor device may be a human. In other examples, the user may be another non-human animal.

Humans and other animals have bodily tissue that includes a skin surface, beneath which are cutaneous tissue layers and then subcutaneous tissue layers. The cutaneous tissue layers may include, from the skin surface inwardly, the surface of the skin, an epidermis layer, and a dermis layer. The subcutaneous tissue layers may include a hypodermis layer and then muscle. The skin surface of interest, the associated cutaneous tissue layers of interest and the associated subcutaneous tissue layer of interest may be collectively referred to herein as "skin site".

The properties of tissue that the sensor device may be usable to detect may include one or more physical states of tissue. The tissue may for example be a subcutaneous tissue layer. For example, a sensor device may be usable to detect a contraction state, or a change in contraction state, of a muscle or group of muscles beneath the skin surface where the sensor device is located. The contraction states of a muscle may be associated with particular optical properties, for example reflective properties, of the muscle tissue. The reflective properties of the muscle tissue may change because of, for example, one or more of a displacement or reshaping of the muscle, a change in local volume, a change in local hardness, or a change in local density of the muscle in different contraction states.

The contraction state of a muscle may be associated with particular optical properties of other non-muscle tissue layers. For example, the contraction state of a muscle may be associated with particular optical properties of one or more of an adjacent hypodermis layer, dermis layer, or epidermis layer. The contraction state of a muscle may be associated with particular optical properties of a skin surface beneath which the muscle is located. The optical properties of tissue layers adjacent to a target muscle may be affected by physical changes in the muscle at different contraction states. For example, in different contraction states a muscle may locally change in shape or volume. These changes may deform surrounding tissue layers, and these deformations may result in changes in the optical properties the tissue layers. For example, a contraction of muscle tissue may cause pressure outwards against the adjacent hypodermis, dermis, and epidermis. This may cause a decrease in the thickness of one or more of these tissue layers, which may alter their optical properties. The contraction of muscle tissue may also cause deformation of the skin surface, by either or both stretching it in-plane or locally deforming it outwards. Such changes at the skin surface may cause changes in the optical properties of components of a sensor device that are placed in contact with the skin surface.

In other examples, a sensor device may additionally or alternatively be usable to detect other properties of tissue and more particularly of subcutaneous tissue. For example, the sensor device may be usable to detect a heart rate of a user to which the sensor is applied. As changes in blood flow within tissue are associated with successive beats of an animal's heart, the changes in blood flow may cause changes in the optical properties of the tissue where the blood is flowing, and/or in adjacent tissue layers.

In other examples, a sensor device may additionally or alternatively be usable to detect other properties of subcutaneous tissue, such as the presence or concentration of different elements or compounds, where the presence or concentration of those elements or compounds change the optical properties of the tissue. For example, a sensor device may be usable to detect a blood oxygen level of blood in subcutaneous tissue due to the optical properties exhibited by the tissue at different oxygen saturation levels.

The use of a sensor device or sensor devices to identify one or more properties of tissue of the user, such as the activity of a user's muscles, in accordance with the present disclosure may be characterised, in contrast to electromyography (EMG) or forcemyography (FMG) techniques, as lightmyography (LMG).

Any of the optical properties of tissue layers, or other components between either or both a light source and a photodetector and a skin surface, may be associated with particular properties of reflected light from the incident light of the light source or sources by different layers of tissue. The reflected light in respect of a layer represents a reflection of the incident light by the respective layer. These properties may include an intensity of the reflected light. In some examples, these properties may include a distance from the skin layer of interest to each of the light source and the photodetector. Where the properties of tissue change, the changes in properties may be associated with corresponding changes in the properties of reflections of light from within layers of the tissue from incident light of the light source or sources. In other words, changes in tissue properties result in corresponding changes in light reflected by (or at) the skin layers of interest and detected by the photodetector.

By affecting a particular physical state of the tissue of a user, for example by contracting a muscle to a particular contraction state while using the sensor device, the associated properties of light that is reflected from within the tissue may be obtained. Similarly, by affecting different changes in the properties of the tissue of a user, for example by contracting a muscle between two contraction states, changes in the resulting associated properties of light that is reflected from within the tissue may be obtained. Accordingly, the sensor device may detect the physical state of tissue beneath the skin surface based on the properties of light that is reflected from within the tissue and received by the sensor device.

Where the sensor device is used to detect the physical state of a particular muscle, a determined contraction state of that muscle may be usable to infer a relative position of body parts of the user, for example, a flexion or extension position of the forearm and upper arm of a user relative to each other. Similarly, where the sensor device is used to sense the physical state of a particular muscle, changes in a sensed contraction state of that muscle may be usable to infer changes in a relative position of different body parts of the user. For example, a change in a flexion or extension position of the forearm and upper arm of a user relative to each other.

Data collected from sensed reflected light properties from a sensor device in association with a particular region of tissue, for example a particular muscle, may be used to generate a model of properties of reflected light that are associated with a particular physical state or change in physical state of tissue, particularly subcutaneous tissue, of a user. For example, a sensor device may be used to gather data of reflected light properties in relation to a chosen contraction state of a particular muscle, or a chosen change in contraction state of a particular muscle. The gathered data may then be used to train a model of characteristic sensed properties that are associated with the chosen contraction state or chosen change in contraction state of that muscle.

For example, the data may be used for training a machine learning model. Such a machine learning model may be trained on sensor data associated with particular physical positions or movements of the user. Once trained, sensor data of the properties of reflected light sensed when a sensor device is applied to a user can be inputted to the trained machine learning model and classified by it, in order to obtain an estimate of a current physical position or movement of a body part of the user.

Accordingly, by training models of the properties of reflected light that are associated with different contraction states of different muscles, a trained model may be generated which is able to classify sensor data of one or more sensor devices and generate an estimate of the contraction states or specific changes in contraction states of different individual muscles.

In some examples, more than one sensor device may be used, each to sense one or more different properties of different regions of tissue of the user. For example, multiple sensor devices may be used each to determine the contraction state of corresponding different muscles of a user. A model based on data of properties of reflected light may be accordingly trained based on sensed values from a plurality of sensor devices, and the trained model can then be used to estimate a physical position or movement of a body part of the user that is associated with the operation of multiple different muscles. For example, multiple sensor devices may be provided for determining the contraction states of different muscles, such as the different muscles in the forearm of a user. Where a trained model of the properties of reflected light that are associated with different contraction states of each of those muscles has been developed, sensed values from each of the sensor devices may be inputted into the trained model, classified by it, and from those classifications and an estimate of the contraction states of each of the muscles may be obtained.

As the contraction state of the muscle or change in contraction state of a muscle or muscles may be associated with a movement of a body part of a user to whom the sensor device is applied, estimation of the physical state of one or more muscles or other subcutaneous tissue regions may allow a physical position assumed by a body part of the user to be estimated. For example, where detectable physical states of a muscle or muscles are associated with a particular physical position assumed by a body part of the user, the estimation of these physical states by one or more sensor devices may allow, by inputting of the sensed values to the trained model, for the estimation of the physical position of the user. Similarly, where detectable changes in the physical states of a muscle or muscle are associated with a particular movement, for example the assumption of a gesture, of the user, the estimation of these physical states by a sensor device or devices may allow, by inputting the sensed values to the trained model, the estimation of the movement or gesture conducted by the user.

An estimated physical position of a body part of a user or estimated movement or gesture of a user may be used to control of devices such as anthropomorphic robotics, actuated exoskeletons, and active prosthetic limbs. For example, the sensor device or a plurality of sensor devices may be used to estimate movements of a user and operate a robot to support or mimic the movement.

In one tested arrangement, a plurality of sensor devices were arranged in an armband, and a machine learning model, the lightmyography model, was trained using data of several different hand gestures of a number of different users. The hand gestures included a rest position, forefinger and thumb pinch gesture, a tripod gesture, a power or first pose, and an extended pose in which each of the fingers of the hand are fully extended. A matching model was also trained using sensor data from an EMG for comparison. Use of the trained models found that the lightmyography model provided higher accuracy of classification of the hang gestures than were provided by the trained EMG model.

EMG sensor data may require processing (e.g., RMS) to be used as training data. This may involve computational power and additional time. Compared to the use of EMG data, the sensor data from the photodetector(s) of the sensor device or devices of the disclosure may, in a model training context, be directly utilised advantageously as training data, without requiring intermediate processing. In an application context, sensor data of the photodetector(s) may be directly provided to the trained model without any intermediate processing.

Where a sensor device is used to provide input data to a trained model in order to receive an estimated physical position or movement of a user to whom the sensor device is applied, a processor and a storage medium may be provided. The storage medium may store the trained model, and the processor may receive the sensor data, input the sensor data to the trained model, and receive classifications, and accordingly estimate a physical position or movement. The processor may store the outputted estimate. The processor may in some examples communicate the outputted estimate to a user, for example by a user interface. The processor may in some examples communicate the output to another device, for example to a server or a controller for a robotic device that is to be operated based on the estimated physical position or movement of the user.

Where a processor is used in conjunction with a sensor device or sensor devices, the processor may be located along with the sensor device or devices. In other examples, the processor may not be located with the sensor device or devices but is able to receive sensor data from the sensor device or devices.

Where a storage medium is used in conjunction with a sensor device and processor, the storage medium may be located along with either the sensor device or processor. In other examples, the storage medium may be located away from the sensor device or processor, for example in a remote location but communicably connected to the processor.

A method of estimating a muscular contraction state of a target muscle may utilise one or more sensor devices. According to such a method, a sensed value of each of the first reflected light and second reflected light at both a first time point and a second time point may be received. The sensed values may be received by a processor, for example. Once the sensed values are received, an estimation may be performed using a processor of a deformation of a cutaneous region adjacent the skin of a user to whom the one or more sensor devices are applied. The estimation may be based on the sensed value of the first reflected light. More particularly, the estimation may be based on a classification of the sensed value of the first reflected light by a trained model. An estimation may also be performed using a process or a deformation estimate of a subcutaneous region of a user to whom the one or more sensor devices are applied. The estimation may be based on the sensed value of the second reflected light. More particularly, the estimation may be based on a classification of the sensed value of the second reflected light by a trained model. An estimation of a muscular contraction state of a muscle or respective muscles adjacent the or each light sensor may be performed using the processor. The estimation may be based on a combination of the estimated cutaneous deformation and estimated subcutaneous deformation.

The properties of reflected light sensed by a sensor device may include the properties of reflected light originally incident from two different light sources.

The properties of reflected light sensed by a sensor device may include the properties of reflected light of two different wavelengths.

The properties of reflected light sensed by a sensor device may include the properties of reflected light from two different light sources, where the reflected lights from the different light sources are of different wavelengths.

A sensor device may include an elastic light-transmissive layer which has optical properties that change as a result of deformation of the light-transmissive layer. The elastic light-transmissive layer may resiliently deform. The light-transmissive layer may elsewhere herein be referred to as an elastomer layer or an elastomeric pad. The light-transmissive layer may have a first side and a second side, and a thickness between the two sides. The second side of the light-transmissive layer may be for being located against a skin surface of a user in use.

The optical properties of tissue or of a light-transmissive layer that may change with deformation of the tissue or layer may include one or more of the transmittance, absorption, scattering, or reflectance of light incident on or passing through the tissue or layer. The optical properties of tissue or a light-transmissive layer may also include the perceived colour of the tissue or layer.

In at least some examples, the sensor device may detect an intensity of light reflected from (or by) different layers of tissue.

A deformation of a light-transmissive layer may include an in-plane stretching of the light-transmissive layer, which causes a change in thickness of the light-transmissive layer between its first and second sides. A deformation may additionally or alternatively include a compression of the light-transmissive layer between its first and second sides, such that a thickness of the light-transmissive layer changes. Such changes in the thickness of the light-transmissive layer may change the optical properties of the layer, so that it accordingly affects light that traverses through it. For example, an increase in the thickness of the light-transmissive layer may be associated with an increased attenuation of light that traverses therethrough, while a decreased in the thickness of the light-transmissive layer may be associated with a decrease in the attenuation of light that traverses therethrough.

Where a light-transmissive layer deforms, a change in shape of the light-transmissive layer due to the deformation may additionally or by itself alter the optical properties of the light-transmissive layer. For example, where deformation changes the thickness of the light-transmissive layer, an increase or reduction in the thickness may cause a respective decrease or increase in the intensity of a constant intensity of incident light from one side of the light-transmissive layer which sensed at the other side of the light-transmissive layer.

The use of a light-transmissive layer in a sensor device may allow one or both of a light source and photodetector to be spaced away from the skin surface of the user in use. This may allow for incident light from the light source to be reflected from the skin surface and received by the photodetector. This spaced arrangement is suitable for shorter wavelengths (e.g., green). Where deformation of the light-transmissive layer occurs, the resulting change in the optical properties of the light-transmissive layer may enhance or cause a change in the properties of light that is reflected from tissue and that passes outwardly through the light-transmissive layer. That is, the change in optical properties of the light-transmissive layer may cause a corresponding change in optical properties of light passing therethrough.

A light-transmissive layer may be made from an elastic material. For example, the light transmissive material may include silicone having a Shore harness of 00-30. Portions of the light-transmissive layer may be dyed to alter influence of environmental light on the light detection. For example, the light-transmissive layer may have portions that are dyed black to reduce such influence of environmental light.

The thickness of the light-transmissive layer may be selected to provide a desired effect on either or both of incident light and reflected light that passes through it. An increased thickness of the light-transmissive layer may be associated with the transmission of light having longer wavelengths. The thickness of the light-transmissive layer may be selected to provide a desired reflection area of the incident light on the skin surface or other tissue layer.

In some examples, the light-transmissive layer may include regions of different thicknesses, each with a different light source and/or photodetector associated therewith.

As is subsequently described, the light-transmissive layer may include one or more dopants to alter the optical properties of the light-transmissive layer. The one or more dopants may additionally alter how the optical properties of the light-transmissive layer change as its thickness changes. That is, the light-transmissive layer may be doped or otherwise configured to alter a relation between the thickness and the optical properties of the light-transmissive layer.

The first light source of a sensor device may be configured to emit a first incident light through the light-transmissive layer towards the skin surface (or a skin site of interest). To this end, the first light source may be located at or facing the first side of the light-transmissive layer, opposite the skin surface of the user in use. In some examples the first light source may be partially or fully embedded within the light-transmissive layer. Where the sensor device is configured so the light-transmissive layer or part thereof is between the first light source and the skin surface of the user, at least the first incident light from the light sensor will pass through the light-transmissive layer.

The second light source of a sensor device may be configured to emit a second incident light. In some examples the second light source may also be configured to emit the second incident light through the light-transmissive layer. In other examples, the second light source may be configured to emit the second incident light other than through the light-transmissive layer. For example, the second light source may be configured to emit the second incident light directly to the skin surface of a user.

The photodetector of a sensor device may be configured to detect a first reflected light which represents a reflection of the first incident light. The photodetector may be configured to detect a second reflected light which represents a reflection of the second incident light. The first reflected light and second reflected light may be reflected by different tissue layers of the user. For example, the first reflected light may be reflected by a cutaneous tissue layer, and the second reflected light may be reflected by a subcutaneous tissue layer.

The photodetector may be provided at or towards the first side of the light-transmissive layer, being the side facing away from the skin surface of the user in use. In some examples, the photodetector may be partially or fully embedded within the light-transmissive layer. Where the light-transmissive layer or part thereof is provided between the photodetector and the skin surface of the user, the first reflected light and second reflected light may pass through the light-transmissive layer before being received by the photodetector.

In some examples, a sensor device may include a first photodetector and a second photodetector for detecting the first and second reflect lights, respectively. The first photodetector may be provided at or towards the first side of the light-transmissive layer to detect the first reflected light via the light-transmissive layer, and the second photodetector may be arranged to avoid detecting the second reflected light via the light-transmissive layer. For example, the second photodetector may be located on the skin surface, either at the second side of the light-transmissive layer or on laterally adjacent of the light-transmissive layer to directly detect the second reflected light.

The wavelength or wavelengths of light emitted by the first light source and second light source may be different to each other. As different wavelengths of light may penetrate to different depths within tissue before being reflected, the emission of different wavelengths of light by the first light source and second light source may allow the sensor device to receive reflected lights from different tissue layers.

Shorter wavelengths may penetrate less into the tissue, providing an increased intensity of the reflected light. This may provide a more sensitive response, allowing for physical changes in the tissue to be more accurately sensed. Longer wavelengths may penetrate deeper into the tissue, providing a lower intensity of reflected light, but allowing sensing of physical changes in deeper layers of the tissue.

In some examples, a sensor device may be configured so that the first reflected light is reflected at or adjacent to a skin surface of the user. For example, the wavelength of light emitted by the first light sensor may be such that at least some of the first incident light is reflected as the first reflected light by the skin surface. In such examples, the wavelength of light emitted by the first light sensor may correspond to a green light, having a wavelength of about 500 nm to about 565 nm.

In other examples, a reflective element may be provided at the skin surface, which reflects the first incident light. The reflective element may act to increase the reflection of incident light thereon. In such examples, the wavelength of light emitted by the first light sensor may be any wavelength or plurality of wavelengths which is reflected by the reflected by the reflective surface. The reflective surface may for example be provided at the second side (the skin-facing side) of the light-transmissive layer. The second side of the light-transmissive layer may be provided with a reflective coating. The reflective coating may be a flexible reflective coating. The reflective element may be arranged in a path of the incident light to improve an intensity of the resultant reflected light while allowing the incident light to penetrate the skin surface. The reflective element in one configuration is suitable for use with an incident light of a shorter wavelength (e.g., green) relative to one with a longer wavelength (e.g., infrared). In an example with incident lights of different wavelengths, respective reflective element portions may be associated accordingly with the incident lights of suitable, compatible wavelengths. The reflective surfaces may be employed to advantageously reduce adverse effects of factors, such as reflectance, roughness and pigmentation of the human skin. With a shinier surface of a higher reflectance, a higher signal response or SNR can be achieved to facilitate distinguishment between different muscle movements.

In some examples, a sensor device may be configured so that the second reflected light is reflected at or within a subcutaneous tissue layer. In such examples, the wavelength of light emitted by the second light sensor may have a wavelength of about 625 nm to about 1,400 nm.

Where a sensor device has a reflective surface at the skin surface, the first photodetector may be configured to receive the first reflected light from the reflective surface, and a second photodetector may be provided and configured to receive the second reflected light from a subcutaneous tissue layer. The second photodetector may be provided so that second reflected light received by it passes through the light-transmissive layer. In other examples, the second photodetector may be provided so that the second reflected light received by it does not pass through the light-transmissive layer. For example, the second photodetector may be provided directly facing the skin surface of the user.

Where a sensor device includes a first and second light sources, the light sources may be configured to alternately emit the respective first incident light and second incident light. The alternate emissions may be configured so that they are non-contemporaneous with each other. By such a configuration, a distinguishment of the first reflected light and second reflected light may be aided at the photodetector or photodetectors of the sensor device.

Where a sensor device has a first light source that is provided at a first distance away from the skin surface of a user, and a second light source that is provided at a different second distance away from the skin of the user, the sensor device emits light from multiple, different distances from the skin surface. Such a sensor device may be referred to as a multi-layer sensor device, or as a multi-layer light sensor. In some examples, the first distance may be a distance equal to the thickness of the light-transmissive layer, while the second distance is zero, so that the second light source emits light at the skin surface.

The light sources of a sensor device may be provided by any light emitting device. In at least some examples, the light sources of a sensor device are provided as light emitting diodes (LEDs).

In some examples, the sensor device may be configured to block external environmental light from being received by the photodetector or photodetectors. For example, a housing or other non-light-transmissible element may be provided about the light sources, photodetector or photodetectors, and the light-transmissible layer, to block environmental light when the sensor device is placed in contact with the skin surface of the user. Such light blocking arrangements blocks unintentional detection of the environmental light by the photodetector.

The technologies disclosed herein, such as the sensor device and combinations thereof, are generally applicable to sensing movement, deformation and/or displacement of soft tissue adjacent the skin surface. Some exemplary applications of the technology include wearable human-machine interfaces, physiological sensors (such as heartrate monitors), and/or soft tissue pressure sensors. Detailed examples of the technology are presented for human-machine interfaces. In these examples, the disclosure relates to systems and methods for detecting muscle activation underneath the skin. Muscle activation can be used for the control of a variety of devices, such as computer systems, bionic/prosthetic grippers and/or lower limb prostheses. However, the technology can be readily adapted for other soft tissue sensing and/or measurement applications.

In at least some examples, a wearable band, such as an armband or leg band, is used to hold several multi-layer light sensors or sensor devices next to the skin of a user. The light sensors can detect muscle movement from deformation of the skin close to the band. In at least some examples, the light sensors comprise at least two light sources, such as LEDs, that project light onto the skin, and at least one photodetector that is arranged to receive light from the light sources. The sensor output can be used for the control of devices such anthropomorphic robotics, actuated exoskeletons, and active prosthetic limbs.

For example, the band can be worn by a user about the forearm to provide data for interpretation of grip type (e.g. power grip/pinch grip/cylindrical grip) and/or gestures for an active prosthetic hand or exoskeleton glove. In at least some examples, three or more light sensors or sensor devices are arranged circumferentially around the band to detect movement of the muscles in the forearm that affect finger and/or wrist movement.

In at least some examples, the light sensor is configured with an elastomer layer, such as silicone, disposed between one of the light sources and the skin. The elastomer may have a thickness of about 1 mm to about 20 mm. For example, the elastomer layer may have a thickness of between 3 mm and 12 mm. In other examples, other light-transmissive elastic layers may be used.

The intermediate elastomer layer creates a layered structure of light sources within the sensor. For example, a light source that is held immediately adjacent to, or in contact with, the skin is offset from a light source that sits behind the elastomer layer by approximately the thickness of the elastomer layer. The elastomer layer can channel and/or guide light between the light source and the skin. In at least some examples, the light sources of different layers emit light of different wavelengths. For example, a light source that is adjacent the skin can be configured to emit light with a longer wavelength than a light source that is offset from the skin. In some opposite examples, a light source that is adjacent the skin can emit light with a wavelength shorter than about 500 nm, whereas a light source that is separated from the skin by an elastomer layer can emit light with a wavelength longer than about 650 nm.

The elastomer layer can comprise an elastomeric pad that is interposed between one or more light sources and the skin to regulate the distance between the light source and the skin, manipulate the transmissivity of the gap between the light source and the skin, and/or control other attributes that can be used to tune the response of the sensor.

For example, the elastomeric pad can incorporate a dopant that changes the absorptivity of the material responsive to deformation. In some examples, the elastomeric pad can have one or more sections that reflect, scatter, or absorb at least a portion of the light emitted by the light source.

For example, the elastomeric pad can have a reflective surface configured to cover a portion (e.g. a third, a quarter, a half) of the skin surface so that a corresponding portion of light emitted by the light source is reflected by the reflective surface, and that a remaining portion of light emitted by the light source is reflected by an epidermal layer of the skin.

In some examples, the mechanical properties of the elastomeric pad can be used to tune the response of the sensor. For example, the deformation characteristics of the elastomeric pad can be adjusted to control the dynamic range and/or resolution of the sensor by creating non-linear transmissivity and/or absorptivity characteristics.

At least one photodetector is arranged to receive light reflected from the skin of the user. In some examples, a single photodetector may be arranged to receive light from two or more light sources.

For example, a single photodetector can be offset from the skin and disposed laterally between adjacent light sources. In at least some examples, an elastomer layer is interposed between the photodetector and the skin surface. The photodetector can be disposed in the same layer as one of the light sources, or in a layer intermediate to the light sources. For example, the photodetector can be offset from the skin by an intermediate elastomeric layer so that the photodetector is closer to the skin than one light source, and farther from the skin than another light source.

In at least some examples, the sensor is configured to interleave light pulses from two or more light sources that share a common photodetector. For example, the sensor can interleave the time periods that each of the light sources are emitting light so that the photodetector does not concurrently receive light from more than one light source. The sensor can be configured to measure (or detect) the intensity of light incident on the photodetector concurrently with each light pulse. In some examples, the light captured by the photodetector in sequential time periods is reflected from different types of soft tissue and/or different layers of the skin. The sensor can be configured to alternate measurements from the surface of the skin with measurements from beneath the surface of the skin to create a composite light measurement. In some examples, each light source has a dedicated photodetector so that measurements from different types of soft tissue and/or layers of the skin can be obtained concurrently.

In at least some examples, the sensor is configured to detect movement and/or deformation in distinct layers, sections, and/or depths of soft tissue. For example, the light sources can be configured so that the light that they emit penetrates the skin to different extents. In at least some examples, a red or infrared LED is held adjacent the surface of the skin so that the light emitted by the LED, and subsequently captured by the photodetector, is reflected by tissue beneath the skin surface, such as subcutaneous fat and/or muscle. Light of longer wavelengths can achieve a deeper skin penetration and provide complementary data that can be beneficial for decoding (e.g., estimating) the user's muscle movements. Light of longer wavelengths can also be used to acquire some health information, which can be a potential advantage of light-based myography over classic EMG techniques. A shorter wavelength LED (such as a green, blue, violet, or ultraviolet LED) can be used to obtain more superficial measurements (e.g. from the epidermal layer of the skin). Light of shorter wavelengths penetrate the skin less resulting in better reflection and leading to a more sensitive response. In at least some examples, differential tissue measurements can be obtained and/or enhanced by the physical arrangement of the light sources with respect to the skin surface. For example, the gap between a light source and the skin surface can be adjusted to regulate the depth of light penetration.

In some examples, the sensor may be used to estimate subcutaneous tissue movements from a composite light measurement. The composite light measurement can comprise light of a first wavelength reflected from the surface of the skin, and light of a second wavelength reflected from tissue beneath the surface of the skin, such as muscle, connective tissue and/or subcutaneous fat. For example, the sensor can be configured to obtain a deformation estimate for an epidermis layer of the skin from an intensity of light captured at the first wavelength, and a deformation estimate for a dermis layer of the skin from an intensity of light captured at the second wavelength. The combined deformation estimates for the epidermis layer and the dermis layer of the skin can function as a proxy for muscle and/or connective tissue movement in at least some applications. For example, an estimate of muscle contraction may be calculated from the intensity of light at the first wavelength and the intensity of light at the second wavelength present in the composite light measurement. In at least some examples, an artificial limb, exoskeleton glove and/or robotic gripper can be actuated or otherwise controlled responsive to the calculated estimate of muscle contraction.

An exploded view of an exemplary multi-layer sensor module 200 is shown in FIG. 1. The sensor module 200 has two LED light sources 202, 203 and a single photodetector 205. The photodetector 205 may be provided in the form of a photodiode. The photodiode is co-located with the first light LED source 202 in the illustrated embodiment. The LED light sources 202, 203 and photodetector 205 are secured within a housing 201 when the sensor module is assembled. The housing 201 has an elastomer layer that covers the skin facing surface of the sensor module in the illustrated embodiment. The thickness of the elastomer layer varies across the skin facing surface of the housing 201. For example, the thickness of the elastomer layer adjacent the first LED light source 202 can be about 4 mm to about 8 mm, whereas the thickness of the elastomer layer adjacent to the second LED light source is generally negligible (e.g. less than about 1 mm thick). In some examples, the elastomer layer does not extend across an area adjacent the second LED light source 203. A backing plate 204 holds the LED light sources securely within the housing 201. In at least some examples, the backing plate 204 biases the LED light sources toward the elastomer layer so that there is a tight interference fit and/or not appreciable gap between the LED light sources and the elastomer layer. In some examples the backing plate 204 may elastomeric or include an elastomeric portion.

Figure 2:
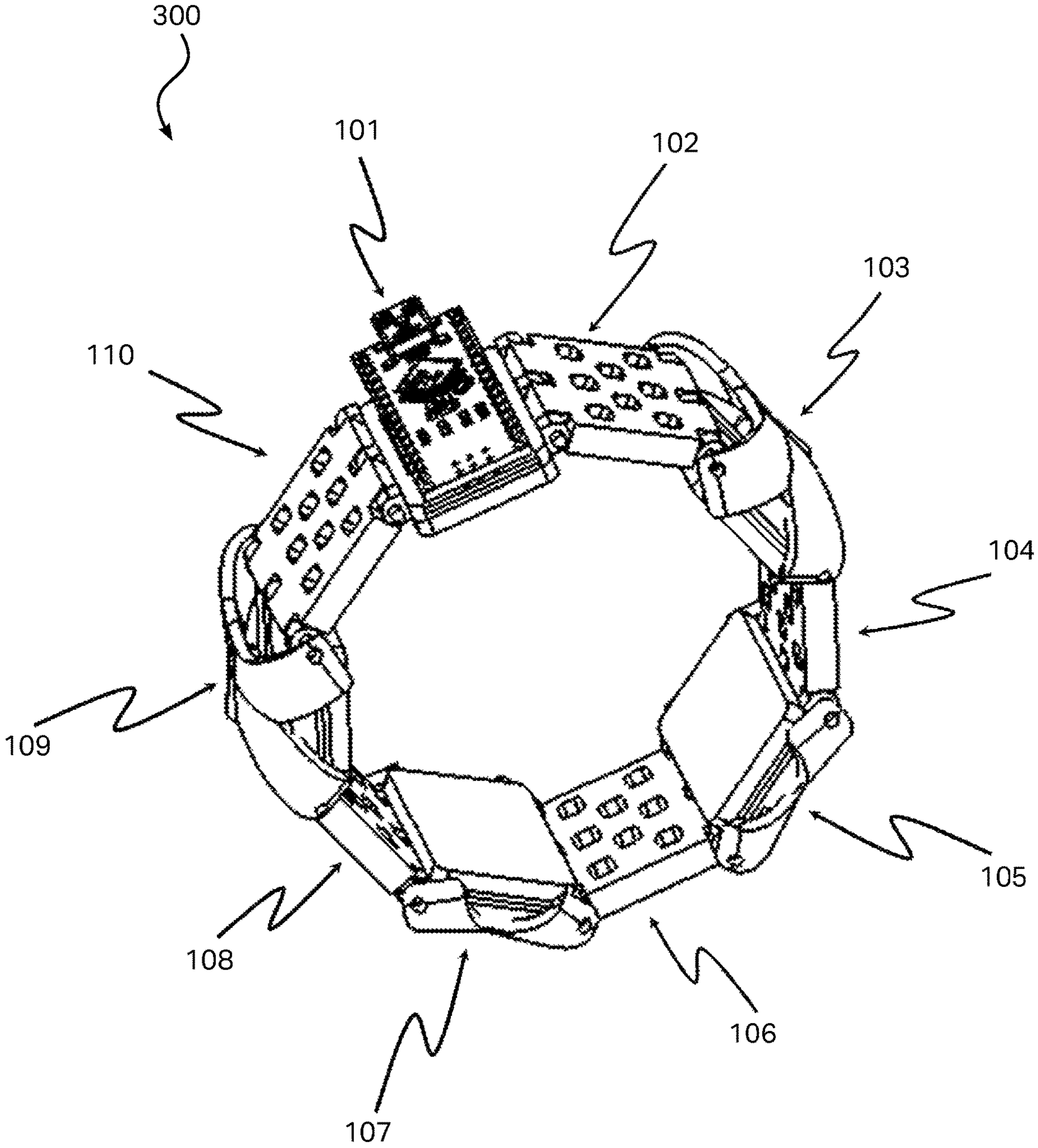
FIG. 2 is schematic view of an exemplary armband comprising five light sensors arranged circumferentially around the armband.

An armband 300 comprising five sensor modules 101, 103, 105, 107, 109 is presented in FIG. 2. The sensor modules 101, 103, 105, 107, 109 are distributed evenly around the circumference of the armband 300 in the illustrated embodiment. Compliant straps 102, 104, 106, 108, 110 extend between adjacent sensor modules 101, 103, 105, 107, 109 to hold the sensor modules 101, 103, 105, 107, 109 together in the band. The length of the compliant straps 102, 104, 106, 108, 110 defines the distribution of sensor modules 101, 103, 105, 107, 109 around the circumference of the band and the inter-sensor spacing. A pin is used to secure the lateral ends of each sensor module 101, 103, 105, 107, 109 to a corresponding strap 102, 104, 106, 108, 110.

The illustrated armband 300 is configured to be worn about a mid-forearm of a user. In at least some examples, the unstrained circumference of the armband is configured to be smaller than the circumference of the user's forearm so that the strain induced in the armband causes the elastomer layer of a housing of each sensor module 101, 103, 105, 107, and 109 to be held in contact with the user's skin when the armband is worn. In the illustrated embodiment, the compliant straps 102, 104, 106, 108, 110 stretch to increase the inner circumference of the armband 300 and accommodate the forearm of the user. This produces an axial strain in the straps 102, 104, 106, 108, 110 that keeps the armband 300 firmly fitted to the user's forearm and the sensor modules 101, 103, 105, 107, 109 in contact with the skin. The elastomer layer on the skin surface of the sensor modules 101, 103, 105, 107, 109 can be configured to distribute the force applied by the armband 300 on the skin and/or alleviate localised pressure concentration. The elastomer layer on the skin surface may be compressed by the pressure of the elastomer layer against the user's arm.

The action of the compliant straps 102, 104, 106, 108, and 110 where they are stretched to apply to the body of the user may act to provide a biasing of the sensor modules 101, 103, 105, 107, and 109 against the skin surface of the user.

The number, size, distribution and/or configuration of sensor modules can be adapted to suit different applications. For example, sensors with larger skin facing surface areas, more light sources, and/or more photodetectors can be used for lower limb applications. Likewise, the sensor modules can be concentrated adjacent particular muscles instead of evenly distributed around a limb or other body part. For example, a heartrate monitor may comprise one or more sensor modules clustered adjacent the sternum.

Figure 3A:
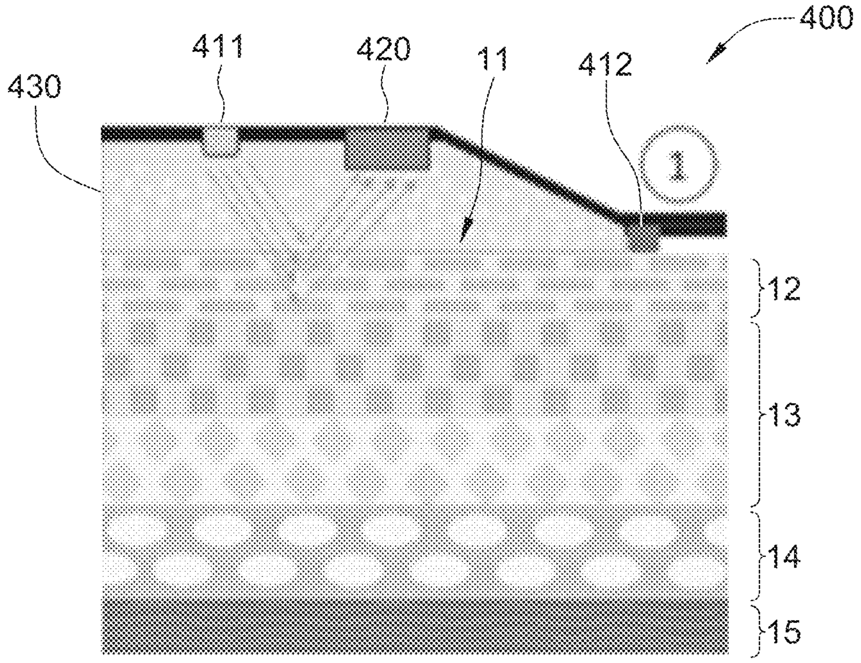
FIGS. 3A and 3B are cross-sectional diagram of the multi-layer sensor module shown in FIG. 1 illustrating one path that light can take from each of the two light sources to the photodetector.
Figure 3B:
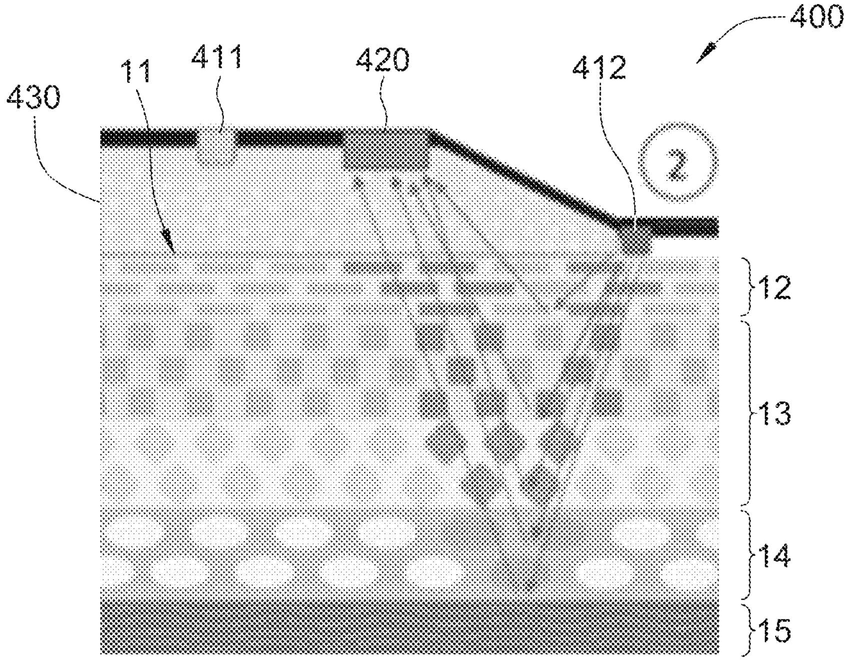

A cross-sectional schematic view of a two-layer sensor modules 400 placed on the soft tissue of the user is shown in FIGS. 3A and 3B. As seen in FIGS. 3A and 3B, the soft tissue under the sensor module comprises the skin surface 11, an epidermis layer 12, a dermis layer 13, hypodermis layer 14, and a muscle layer 15. The sensor module 400 comprises two light sources 411 and 412 disposed respectively at opposite lateral sides of a photodiode 420. A red or infrared LED light source 412 is disposed next (i.e., adjacent) to the skin to the right of the photodiode 420. A green LED light source 411 is disposed to the left of the photodiode 420. A silicone layer 430 is disposed between the green LED light source 411 and the photodiode 420 and the skin surface 11. In this example, the silicone layer 430 is shown to be arranged atop the skin surface 11, and the photodiode 420 and the light source 411 are shown to be arranged atop the silicone layer 430. The photodiode 420 is thus disposed on the same layer as the green LED light source 411, with the photodiode 420 and the light source 411 having the same spacing from the skin surface 11. The lateral spacing between each LED light source 411 and 412 and the photodiode 420 is determined, at least in part, by the respective path traversed by light emitted by the respective light source 411 and 412 to reach the photodiode 420, with the light path of the light source 411 crossing the silicone layer 430. In some examples, the lateral spacing between each LED light source and the photodiode can be determined entirely from the expected light path. In other examples, the light sources can be evenly spaced about the photodiode.

In FIG. 3A, the sensor module 400 is shown emitting light from the green LED light source 411, while the red or infrared LED light source is inactive 412. The emitted light, with a wavelength in the green spectrum (from 500 nm to 565 nm in wavelength, approximately), is shown passing through the silicone layer 430, penetrating the surface 11 of the skin and reflected from (or by) the epidermal layer 12. In some examples, the surface 11 of the skin can reflect a portion of the incident light. The reflected light passes through the silicone layer 430 to be detected by the photodiode 420. The intensity of green light captured by the photodiode 420 can depend, at least in part, on the distance the light travels. For example, movement of an underlying muscle and/or connective tissue can compress the silicone layer 430 and shorten the light path between the green LED light source 411 and the skin surface 11. The optical properties of the skin surface adjacent the sensor module 400 can also be altered by movement of an underlying muscle and/or connective tissue. For example, the density, mix and geometry of the tissue can change with deformation and cause the intensity of light captured by the photodiode 420 to change. The light source 411 can thus be understood to be configured to emit light through the silicone layer 430 towards the skin (e.g., a skin site) for reflection by the epidermal layer 12 (or an epidermis skin portion) and, in some examples, by the skin surface 11. Furthermore, in this example, the silicone layer 430 is adapted to be arranged on the skin surface 11 and is configured to normally space the light source 411 apart from the skin surface 11 by 5 mm. This 5 mm spacing permits an increased amount of reflection of light emitted by the light source 411 to be detected by the photodiode 420, which improves an intensity of the detected light.

In FIG. 3B, the sensor module 400 is shown emitting light from the red or infrared LED light source 412, while the green LED light source 411 is inactive. The emitted light, with a wavelength in the red or infrared spectrum (approximately 625 nm-1400 nm, or longer), is shown penetrating the surface 11 of the skin and reflected from (or by) a layer of subcutaneous fat, for example the hypodermis layer 14. In at least some examples, light in the red or infrared spectrum can be reflected from the dermal or dermis layer 13 of the tissue, subcutaneous fat (such as the hypodermis layer 14, otherwise known as the subcutaneous tissue layer), muscle 15, and/or connective tissue. The reflected light passes through the overlapping layers of tissue and the silicone layer 430 to reach the photodiode 420. The intensity of red or infrared light captured by the photodiode 420 can depend, at least in part, on the distance the light travels. For example, movement of an underlying muscle and/or connective tissue can compress the silicone layer 430 and shorten the light path between the skin and the photodiode 420. The optical properties of the soft tissue under the skin surface can also be altered by movement of an underlying muscle and/or connective tissue. For example, the density, mix and geometry of the tissue can change with deformation and cause the intensity of light captured by the photodiode to change. In this example, the light source 412 is placed in contact with the skin to achieve a deeper light penetration. The light source 412 can be understood to be configured to emit light toward the skin for reflection by the hypodermis layer 14 (or a non-epidermis skin portion) and, in some other examples, by the other layers 13 and 15. The infrared light of the light source 412 may interact with other layers such as the dermis when passing therethrough, and the detected reflection of the infrared light may thus be indicative of movements occurring at those other layers.

It can thus be understood that the silicone layer 430 is elastic and light-transmissive and has an optical property that changes in response to deformation of the silicone layer 430. It may also be understood that the silicone layer 430 is elastically deformable to cause a corresponding change in an optical characteristic of light traversing through the silicone layer 430. For example, the silicone layer 430 may have an optical property that changes in response to elastic deformation of the silicone layer 430 to cause a corresponding change in an optical characteristic of light traversing through the silicone layer 430.

In some examples where the photodiode 420 is placed in contact with the skin surface 11, reflected light is detected directly by the photodiode 420 without traversing through the silicone layer 430.

Figure 4:
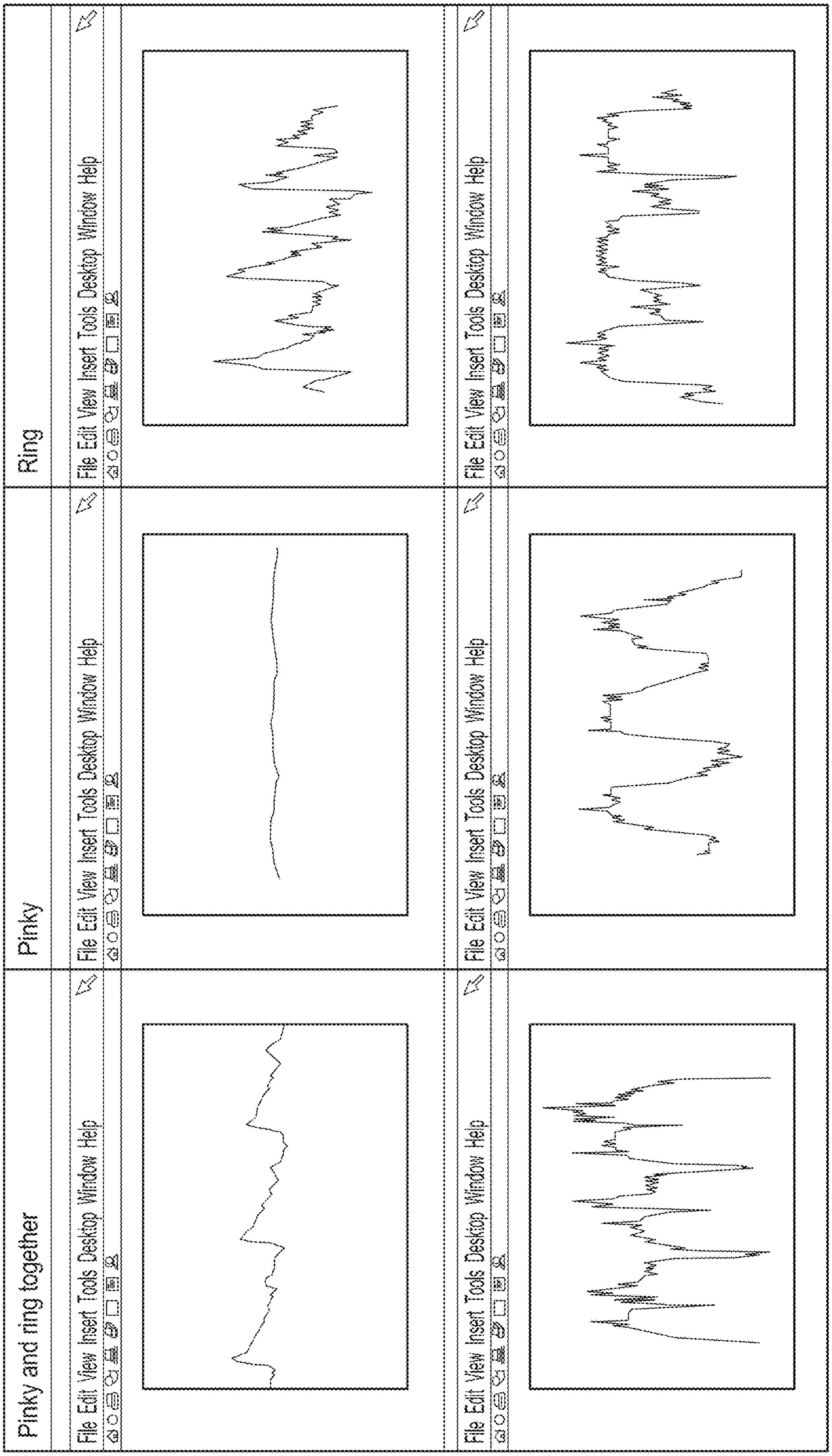
FIG. 4 is a series of graphs illustrating the wavelength dependent output from a multi-layer light sensor for three distinct finger movements.

A series of exemplary graphs showing the tested output from the sensor module of FIGS. 3A and 3B for three different types of gesture are presented in FIG. 4. The upper graphs represent the intensity of infrared light captured by the photodiode. The lower graphs represent the intensity of green light captured by the photodiode. The sensor module was held against the skin of a user's forearm while the user moved the fingers of the corresponding hand. The graphs on the left represent the photodiode output for concurrent flexion of the ring and pinky fingers. Those in the middle represent the photodiode output for flexion of the pinky finger alone. Those on the right represent the photodiode output for flexion of the ring finger alone. It is evident form the graphs of FIG. 4 that the two LED light sources 411 and 412 in the sensor module 400 produce complementary information indicative of the movement and/or deformation of soft tissue in the forearm.

In at least some examples, the soft tissue at different layers and/or depths below the skin surface respond differently to movement and/or deformation of muscle and/or connective tissue. For example, subcutaneous fat can shift and/or reconfigure beneath the skin surface as an underlying muscle contracts. These changes are not always evident from the skin surface. In at least some examples, a composite measurement compiled from light reflected at different layers of soft tissue can produce more accurate and/or more robust estimates of muscle and/or connective tissue movement and/or deformation than a single measurement. For example, combining measurement obtained from the skin surface and/or epidermal layer with measurements obtained at the dermal and/or subcutaneous layer can produce more accurate and/or more robust estimates than a single measurement from either location. In at least some examples, an independent component analysis is used to associate the intensity of light captured by the photodiode at different wavelengths with user intent. For example, an independent component analysis can be used to correlate the output of the sensor modules 101, 103, 105, 107, and 109 shown in FIG. 2 with hand gestures and/or types of grip.

A method for estimating subcutaneous tissue movement comprises obtaining a first deformation measurement representative of deformation of an epidermis layer of the skin, obtaining a second deformation measurement representative of deformation of a dermis layer of the skin that is in close proximity to the epidermis layer represented in the first deformation measurement, and combining the first deformation measurement and the second deformation measurement to produce the estimate of subcutaneous tissue movement.

In some examples, the method can comprise estimating the first deformation measurement from an intensity of light reflected from the skin at a first wavelength and estimating the second deformation measurement from an intensity of light reflected from the skin at a second wavelength. For example, the method can comprise interleaving light from a first light source, that emits light at the first wavelength, with light from a second light source, that emits light at the second wavelength, and measuring the intensity of light from the first light source and the intensity of light from the second light source with a single photodetector.

In at least some examples, composite light measurements from different soft tissue layers can be obtained with a sensor device comprising a first light source that is configured to sit on or adjacent the skin of a recipient and direct incident light of a first wavelength through at least the upper layers of the recipient's skin, and a second light source that is configured direct incident light of a second wavelength onto the recipient's skin at a location near the first light source. A compliant pad, made from a transparent or translucent elastomer, can be configured to sit between the second light source and the skin of the recipient. And at least one photodetector can be configured to receive light reflected from the skin and/or subcutaneous tissue of the user and measure an intensity of light at the first wavelength and an intensity of light at the second wavelength.

The sensor can comprise a band that holds the first light source, the second light source, the compliant pad (the silicone layer or the light-transmissive layer) and the at least one photodetector in proximity to the skin. The band can be configured to pre-load (e.g., bias) the compliant pad against the skin of the recipient by applying pressure to the recipient's skin. That is, the band or the like may be configured to apply a bias force on the compliant pad against the skin. Such an arrangement may prevent a gap forming between the compliant pad and the skin during, for example, arm movements, which may in some cases adversely affect the reflection detection by the sensor device. In some examples, the band is configured to circumscribe a limb of the recipient. The compliant pad can be configured to channel light from the second light source to the skin of the recipient. The compliant pad can also be configured to absorb and/or scatter and/or reflect a variable amount of light at the second wavelength as the pad is compressed, and the amount of light that the compliant pad absorbs and/or scatters and/or reflects is dependent on the deformation of the elastomer. In some examples, the second light source has a wavelength that is greater than 650 nm, and the first light source has a wavelength that is less than 550 nm.

In at least some examples, one or more sensors can be combined with a strap, band and/or belt that is configured to hold the sensor(s) next to the skin (e.g. adjacent and/or in contact with the skin). For example, a device comprising a strap with a first light sensor that is disposed adjacent an inner surface of the strap, and a second light sensor that is spaced circumferentially from the first light sensor can be used to obtained composite light measurements from different layers of soft tissue. In at least some examples, the second light sensor is offset outwardly from the inner surface of the strap compared to the first light sensor, and the strap comprises a compressible elastomeric pad that is disposed between the second light sensor and the inner surface of the strap. In some examples, the second light sensor is displaced outwardly from an inner surface of the strap by more than about 2 mm, and the elastomeric pad occupies the space between the second light source and the inner surface of the strap. The first light sensor can comprise a first light source with a first wavelength and a first photodetector, and the second light sensor can comprise a second light source with a second wavelength and a second photodetector. The strap can be configured to apply a radially compressive force on a limb of a recipient that places the first light sensor in contact with, or immediately adjacent, the skin of the recipient.

In some examples, a belt comprising a first light sensor that is configured to detect displacement of skin under the band, and a second light sensor that is configured to detect displacement of soft tissue below the skin surface can be used to obtained composite light measurements from different layers of soft tissue. The first light sensor can be held above the surface of the skin and operate with a wavelength that is between about 625 nm and about 1 mm. The second light sensor can be held adjacent the skin and operate with a wavelength between about 10 nm and about 565 nm.

In some examples, a band comprising at least two light sensors that are configured to detect displacement of soft tissue in close proximity to the band can be used to obtained composite light measurements from different layers of soft tissue. The at least two light sensors can operate in different frequency ranges of the light spectrum, and the band can be configured to position the at least two light sensors at different distances from the skin surface. In some examples, the band comprises a compliant elastomeric material that is disposed between a first of the at least two light sensors and an inner circumference of the band, and the compliant elastomeric material is configured to contact the skin and deform in response to movement of soft tissue immediately under the contacted skin. The compliant elastomeric material can contain a dopant, and the dopant can be configured to alter the transmissibility of light, from the first of the at least two light sensors, through the compliant elastomeric material dependent on the deformation of the compliant elastomeric material. In at least some examples, the first of the at least two sensors can be configured to measure deformation of the compliant elastomeric material as a proxy for displacement of soft tissue. A second of the at least two sensors can be positioned closer to the skin than the first of the at least two sensors. The second of the at least two sensor can be configured to measure displacement of soft tissue below the skin. In some examples, a first light sensor of the at least two light sensors comprises a red or infrared LED light source, and a second light sensor of the at least two light sensors comprises a green, blue, violet, or ultraviolet LED light source.

The light sensor or sensor device of the disclosure can function as an interface that permits a user to intuitively control and/or interact with a machine and/or environment. For example, estimates of soft tissue movement and/or deformation can enable a user to interact with a virtual reality or augmented reality environment, and/or control a robot. An exoskeleton glove is presented here as an example. In this example, the output from the sensor is transformed into a control signal that is used to control an electric motor (e.g. the motor speed and/or torque) of the exoskeleton glove. The motor actuates the fingers of the glove to initiate different types and/or strengths of grip. The control platform for the exoskeleton glove can be readily transferred to other physical systems, such as prosthetic limbs and/or anthropomorphic robots, or artificial environments, such as AR/VR.

Figure 5:
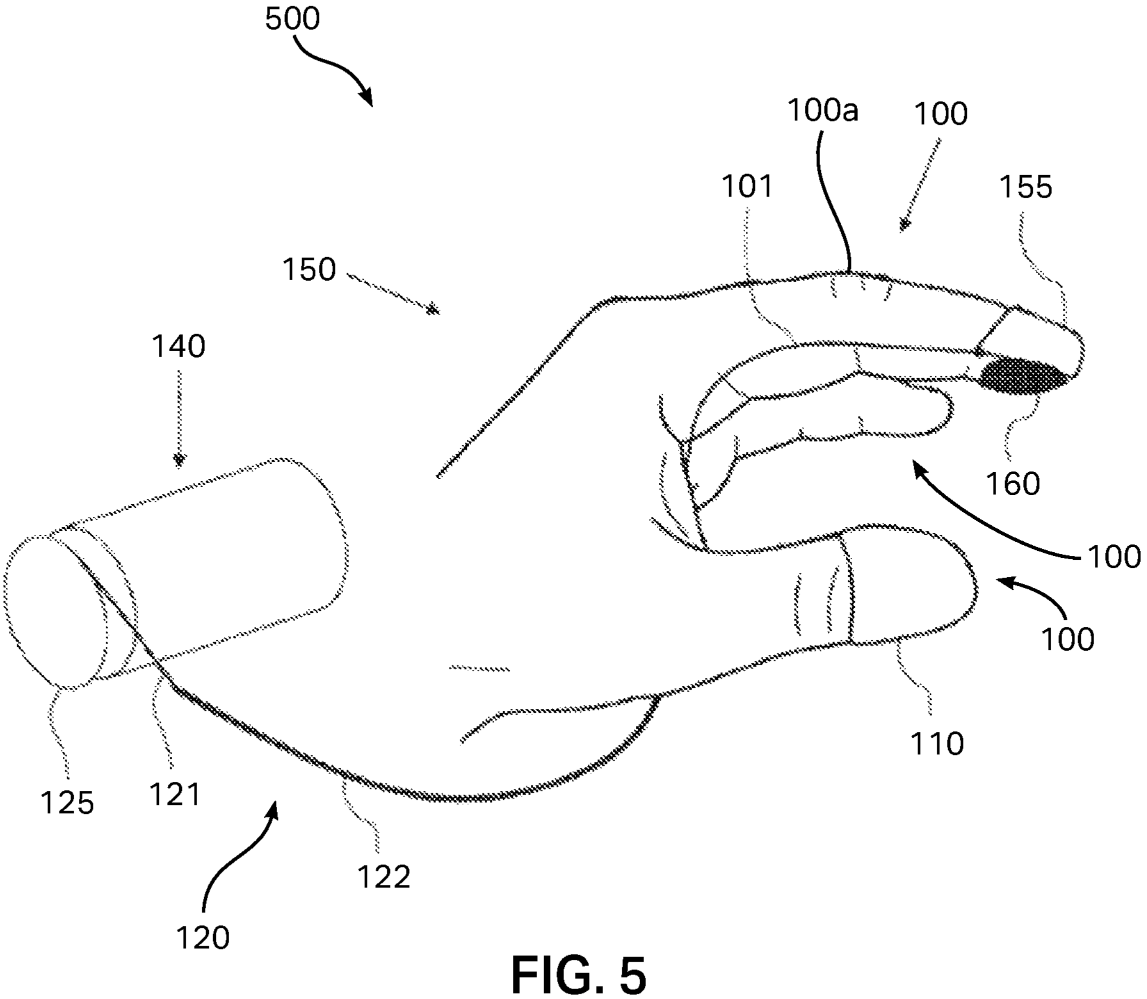
FIG. 5 is schematic view of a grip augmenting glove showing a sheathed cable tendon extending from a differential to the forefinger of the glove.

An exemplary grip augmentation system 500 is shown schematically in FIG. 5. The system comprises an actuated glove 150 that can be worn by a recipient to enhance grip strength. Torque is transferred from an electric motor 140 to the fingers 100 of the glove 150 by a network of artificial tendons. A single artificial tendon 120 is shown in FIG. 5. The depicted tendon comprises a sheathed cable 121 that extends from the actuator, for example electric motor 140, to the tip of the forefinger 100*a*. The distal end of the cable 121 terminates at the tip of the forefinger 100*a* in a finger cap 155. The finger cap 155 anchors the tendon 120 to the glove and distributes forces from the tendon to the recipient's forefinger 100*a*. The illustrated finger cap 155 also includes a sensor 160. The sensor 160 may be a light sensor or sensor device as described herein. The output from the sensor 160 is fed back to a controller that controls operation of the glove. For example, the controller can use the sensor 160 for touch detection, grip regulation and/or performance tracking (e.g. monitoring force distribution to each finger 100).

A proximal end of the cable 121 is wound about the drum of a pulley 125. The pulley 125 is driven by the electric motor 140 to tension the cable 121. The cable 121 transfers force from the electric motor 140 to the finger cap 155 of the glove 150 as it is progressively retracted and wound onto the drum of the pulley 125. The tension forces in the cable 121 cause the recipient's finger to contract, folding inward toward the palm of the glove to augment the recipient's natural grip. A sheath 122 extends from the electric motor 140 to the base of the glove 150. The glove 150 and motor housing (not shown) have ferrules that locate and secure the sheath 122. The sheath 122 is sufficiently compression resistant to maintain a substantially constant cable path length between the electric motor 140 and glove 150 (e.g. preventing contraction of the cable path between the electric motor 140 and the glove 150). In some examples, the sheath can incorporate a low friction coating that reduces the sliding friction experienced by the cable.

Figure 6:
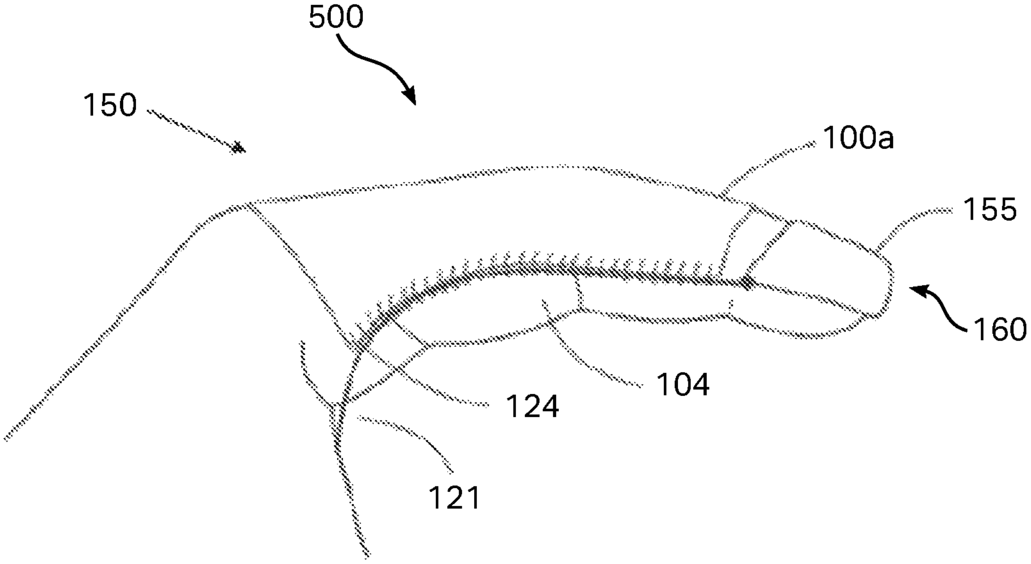
FIG. 6 is a schematic view of a grip augmenting glove showing the routing and termination of a cable tendon with the glove.

An exemplary glove cable guide 124 is shown in FIG. 6. The cable guide 124 restrains the cable 121 to a defined path within the glove 150. The illustrated cable guide 124 comprises a section of stitching that extends along an inner side of the forefinger 100*a*. Another section of stitching (not shown in FIG. 6) extends from the proximal end of the glove (e.g. adjacent the wrist or forearm) to the base of the palm. The cable 121 is unrestrained across the palm of the glove 150 in the embodiment illustrated in FIG. 6. In other examples, the stitching can extend unimpeded between the base of the glove and the finger cap 155, or in discrete sections of different length/configuration. The cable guide 124 can incorporate a compliant liner that reduces cable friction within the glove 150. For example, a PTFE coated elastomeric tube can be used to route the cable 121 through the material of the glove 150 without restricting the recipient's mobility/flexibility. In the embodiment illustrated in FIG. 6, the liner can be stitched into the fabric of the glove 150 at the forefinger 100*a* and extend unrestrained across the palm. The glove 150 can also incorporate a rigid or semi-rigid (e.g. thermoset plastic) palm guide to prevent or alleviate pressure induced cable friction (produced by the clamping forces from some forms of grip).

The fingertip terminated examples shown in FIGS. 5 and 6 cause the forefinger 100*a* to bend in flexion. In some examples, flexion can be replaced or supplemented with other forms of anatomical motion. For example, the actuator such as an electric motor 140 can cause adduction of the thumb by tensioning a cable 121 that terminates at the base of the thumb. The glove 150 can be reinforced at the base of the thumb (e.g. with a thermoplastic insert and/or reinforced loop around the thumb metacarpophalangeal joint) to anchor the cable 121, transfer forces to the thumb, and/or guide movement of the thumb in adduction. In some examples, the glove 150 can be configured to support multiple forms of anatomical motion. For example, thumb adduction can be used in combination with flexion of the thumb for some forms of grip. Independent adduction and flexion can be achieved with separate cables 121 that terminate at the base and tip of the thumb, respectively.

Figure 7:
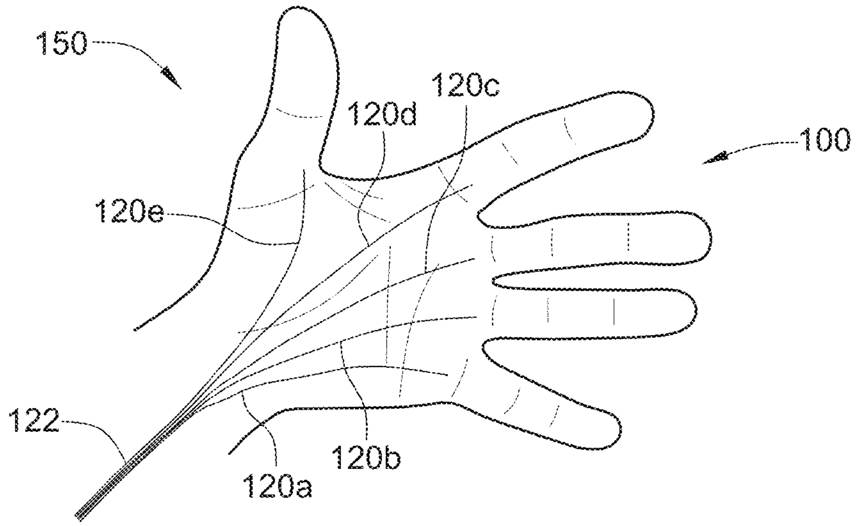
FIG. 7 is a schematic view of a grip augmenting glove showing five cable tendons extending to each finger of the glove.

A grip augmenting glove 150 with five artificial tendons 120*a*, 120*b*, 120*c*, 120*d*, and 120*e* is shown schematically in FIG. 7. The tendons 120 extend from a sheath 122 at the base of the glove 150 and splay outwardly toward each of the five fingers 100. The glove fingers 100 have cable guides 124 that route the tendons 120 to a termination point (e.g. a finger cap 155) on each finger 100. The tendons 120 are actuated by one or more motors that apply and release tension as needed to affect an adequate grip. The sheath 122 routes the tendon cables 121 from the motor(s) to the base of the glove 150. For prosthetic hands and grip augmentation gloves, the motor(s) are usually housed in a wearable module that the recipient carries with them. For example, the motor module can be carried in a backpack, suspended from a belt that's worn around the waist, or held to the recipient's arm by an armband. The carrying mode for wearable systems is usually influenced by the weight and form-factor of the motor module. In some examples, the motor module also houses control electronics. The control electronics regulate the output of the motor(s) to modulate the grasping force applied by the glove 150. For example, the control electronics can incorporate one or more sensors (e.g. EMG and/or force sensors) that the control electronics that to infer recipient intent for force modulation and/or grip initiation.

Figure 8:
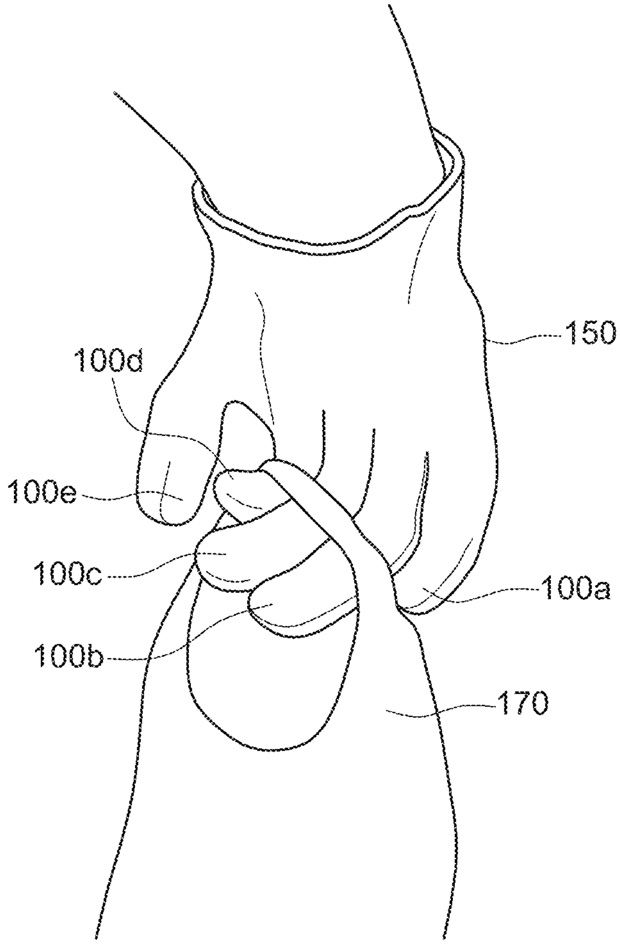
FIG. 8 is a schematic view of a grip augmenting glove being used by a recipient to grasp a cylindrical object.

FIG. 8 shows a grip augmenting glove 150 being used by a recipient to grasp an object 170. In the illustrated embodiment, the artificial tendons 120 are applying a force to at least three of the fingers 100*a*, 100*b*, 100*c*, 100*d*, and 100*e* (e.g. via a finger cap 155 on the corresponding finger). The combination of natural flexion and tendon tension causes the fingers 100 of the glove 150 to curl inwardly toward the palm of the recipient's hand, producing the cylindrical-type grip shown in FIG. 8. The force between the fingers and palm of the hand is representative of the grip strength. In some examples (e.g. rehabilitation), the glove 150 can be configured to replicate a healthy adult grip strength. In other examples (e.g. workplace specific tasks), the glove 150 can be configured to produce forces that exceed natural human grip strength.

The distribution of force to the fingers 100 of the glove 150 can influence the efficacy of the grasp the recipient forms. Grip stability is closely related to the contact area formed with an object. For gripping applications with well-defined constraints (e.g. robotic grippers for repetitive tasks), the force distribution to the fingers can be optimised for specific grip types (e.g. cylindrical, spherical, or pinch grips). Adaptive grippers that conform to the shape of an object can be used for a diverse range of applications and are especially useful for grasping objects with irregular shape. Some examples of adaptive grip can be affected by distributing force to each of the actuated fingers in a way that doesn't impede their freedom of movement (i.e. actuating each finger to independently conform to the surface of the object). For under-actuated systems, this involves splitting the output from an actuator amongst several fingers without inhibiting their freedom of movement when one of the fingers is constrained (e.g. when one of the fingers contacts the surface of an object and stops moving).

Figure 9A:
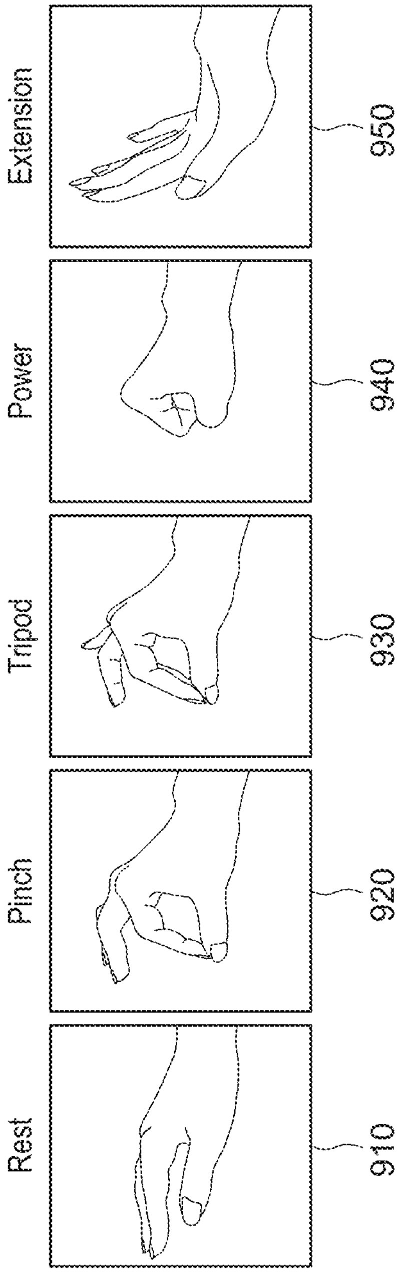
FIG. 9A shows five photos of respective hand gestures.

FIG. 9A shows five example hand gestures used in an experiment for demonstration of accuracy achievable with an armband implemented with a configuration similar to that of FIG. 2, incorporating five sensor module. Shown in this figure is a rest gesture 910, a pinch gesture 920, a tripod gesture 930, a power (clenched first) gesture 940, and an extension gesture 950.

Figure 9B:
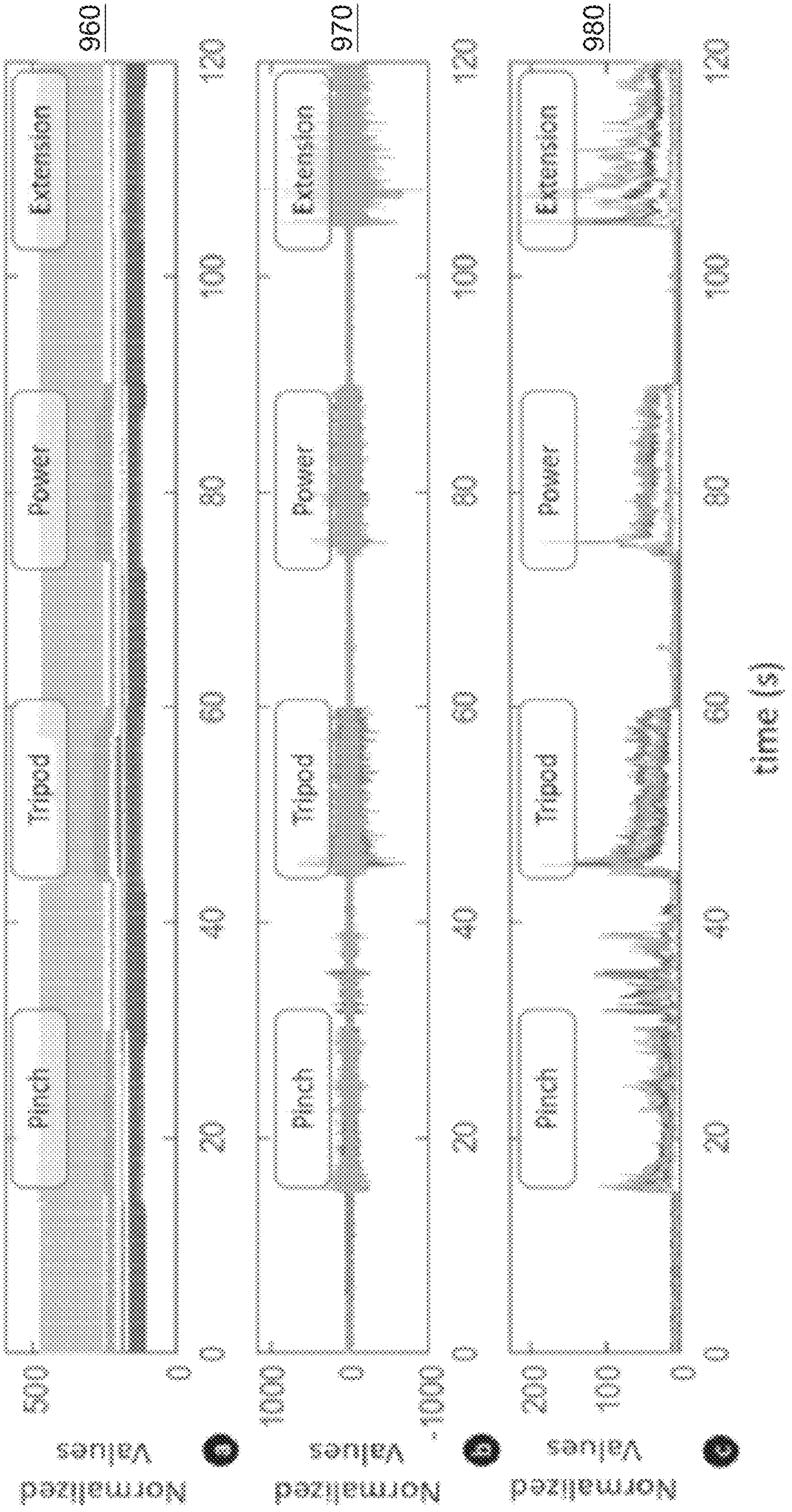
FIG. 9B shows three charts of signal measurements for the hand gestures of FIG. 9A.

FIG. 9B shows three charts 960, 970 and 980 of signal measurement. The first chart 960 shows signal measurements taken with the armband worn by a subject for the five gestures 910-950. The vertical axis represents a scale of normalised activation values indicative of light intensities, and the horizontal axis represents time in seconds. For each of the gestures 910-950, the subject alternates between 15 seconds of rest and 15 seconds of gesture performance, starting with 15 seconds of rest. The first chart 960 shows five measurements in respective shades of grey, representing the five gestures.

The second chart 970 shows signal measurement of raw EMG activation taken concurrently using a conventional bipolar EMG technique (USBamp bioamplifiers from g.tec). The third chart 980 shows root means square (RMS) representations of the measurements of the second chart 970.

Data obtained in relation to FIG. 9B is processed using different processes. In one process, a sliding window of 200 ms and a stride of 20 ms is used to extract features. A sample size (or duration) greater than 125 ms and smaller than 300 ms reduces biases and variance due to real-time constraints of typical prosthetic control systems. In another process, the data is balanced to ensure a same number of samples is used in respect of each gesture to reduce bias towards a particular class. It is worth noting that, unlike with the EMG technique, data obtained with the armband can be processed directly without any filtering operations. Data obtained with the EMG technique is filtered using a Butterworth bandpass configured with a range of 5 Hz to 500 Hz. In addition to the RMS operation, processing of the raw EMG data of the second chart 1020 further includes waveform length, zero crossing, mean absolute value, integrated EMG, Willison amplitude, variance of the EMG signal, and log detector value. Deep learning models with batch normalization layers is available to increase training speed and to eliminate the need for normalization during pre-processing steps.

Three machine learning classification models are developed and used to compare the performance of the armband with that of the conventional EMG technique, namely Random Forest (RF), Convolutional Neural Network (CNN), and Temporal Multi-Channel Vision Transformer (TMC-Vit). The RF model is an ensemble classification method based on a combination of multiple decision trees. In the RF model, the output is the most popular class among the decisions of individual trees. The CNN model comprises three convolutional blocks, four fully connected layers, and a final softmax layer to predict the hand gestures, with each convolutional block being composed of convolutional, batch normalization, and dropout layers. The TMC-ViT model is a Transformer-based model that adapts the Vision Transformer to process temporal data with multiple channels, e.g. LMG signals, as input by employing convolutional and max-pooling layers to reduce the input dimension and extract its embeddings. In the TMC-ViT mode, two convolutional layers are used before the data is supplied to a ViT that extracts 2×2 patches and provides the output to a Transformer encoder composed of four Multi-head Attention layers 41 with four heads each.

The models, serving as classifiers, are trained and validated using 5-fold cross-validation with one separated repetition for testing per fold, with sparse categorical cross-entry as the loss function. The trained models are optimised using Adam and are assessed based on accuracy. Training and optimisation are performed for each model in respect of each gesture and each subject.

In another experiment, measurements of muscle activities taken with the same armband worn on the forearm are used to estimate a grasp force (clenching force). The same regression models are used, and the same model configurations are adopted. In this experiment, each test subject wearing the armband is instructed to perform a first clench with a maximum force and to perform a subsequent clench of a half the maximum force. Each clench lasts for 15 seconds and is spaced apart from the next by a rest period of 15 seconds. For this experiment, a sliding window of 200 ms with a stride of 20 ms is employed, and data obtained using the armband is balanced. In other words, only data obtained during periods in which force is detected by the sensor device is used to train and test the same regression models in this experiment. In this experiment, however, the models have a dense layer with one neuron and a linear activation function serving as the last layer, and the models are trained and validated using 10-fold cross-validation with one separated repetition for testing per fold.

During model training, a mean squared error (MSE) loss function is employed. Efficiencies of the trained regression models are assessed using the Pearson correlation coefficient. Accuracy comparison of actual and estimated forces is expressed in percentage of the normalised mean square error (NMSE). An NMSE value of 0% denotes a bad fit where as an NMSE value of 100% denotes the two trajectories being identical. The NMSE can be calculated as follows:

$$NMSE(\%) = 100 * \left(1 - \frac{\|x_r - x_p\|^2}{\|x_r - \text{mean}(x_r)\|^2}\right)$$

where $\|\cdot\|$ indicates the 2-norm of a vector, $x_r$ represents the actual reference motion, and $x_p$ represents the estimated force.

Figures 10, 11:
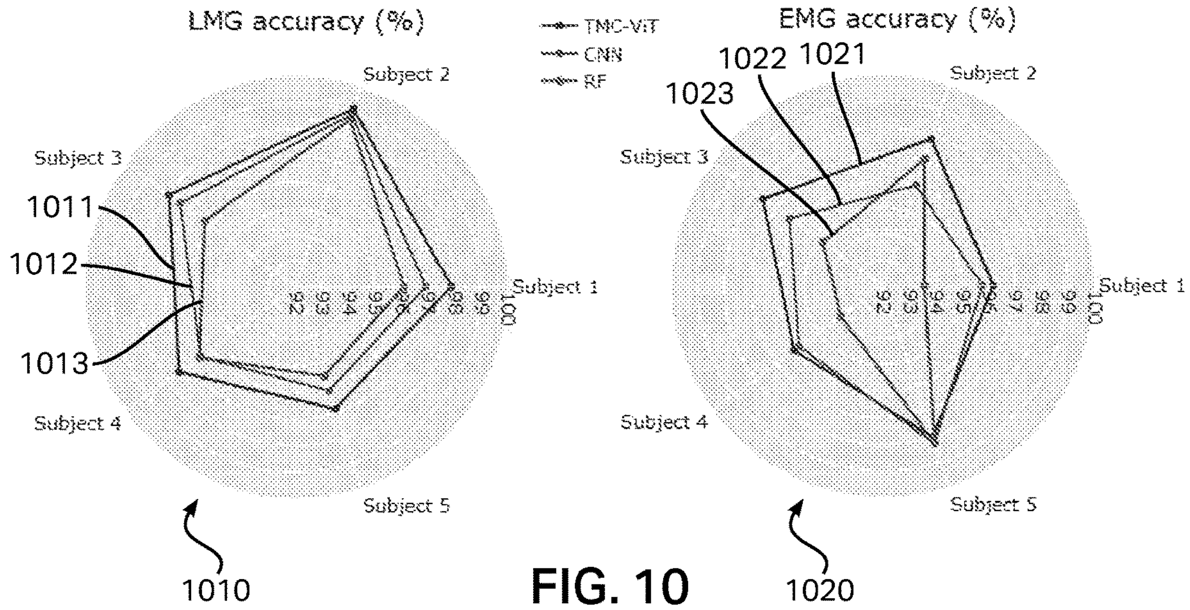
FIG. 10 shows two diagrams of accuracy measurement.
FIG. 11 shows a table of accuracy for three gesture decoding models.

FIG. 10 shows, on the left, a first radar chart 1010 of decoding accuracy in percentage for each regression model in respect of the armband, and, on the right, a second radar chart 1020 of decoding accuracy in percentage for each regression model in respect of the conventional EMG technique. The first radar chart 1010 shows first, second and third lines 1011, 1012 and 1013 corresponding to the TMC-VIT, CNN and RF models, respectively. The second radar chart 1020 shows first, second and third lines 1021, 1022 and 1023 corresponding to the TMC-ViT, CNN and RF models, respectively. As can be seen, the TMC-ViT model achieves the highest accuracy for all test subjects, followed by the CNN model and the RF model. Based on a comparison of the model results, the armband implementation achieves signal performances that are higher and more consistent than those achieved with the conventional EMG technique. According to the TMC-ViT results, the armband can achieve a classification accuracy of up to 99.11%.

FIG. 11 shows a table with classification accuracy for each model in respect of each of the armband and the conventional EMG technique.

It can be seen that measurements obtained with the armband implementation can be used to achieve a better decoding accuracy in respect of each regression models, with a comparatively smaller standard deviation. In addition, measurements obtained using the armband are provided directly to the models, which is more efficient in terms of time and processing resources. In contrast, with the conventional EMG technique, measurements obtained to be processed through additional steps before being provided to the models. This technical advantage is especially important for real-time applications where minimizing sample processing time is of paramount importance. Moreover, due to the bioamplifier size and weight, feature extracted EMG is not a suitable solution for portable applications. In contrast, the armband implementation is advantageous in terms of simpler components, smaller size, lower weight, and lower cost.

Figures 12, 13:
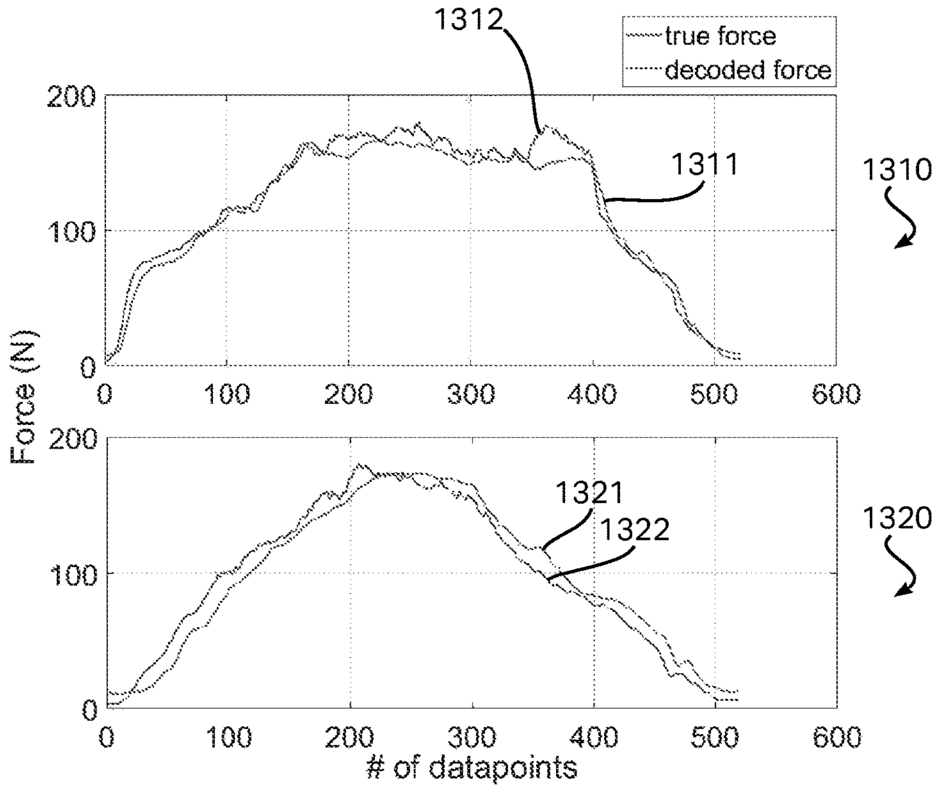
FIG. 12 shows a table of correlation and accuracy for three regression model.
FIG. 13 shows line charts of estimated clenching force versus actual clenching force.

FIG. 12 shows, in relation to the grasp force experiment, a table of correlation and accuracy in respect of each model, where columns marked by "C" represent correlation and those marked by "A" represent accuracy. The TMC-ViT results show the highest correlation and accuracy and the lowest standard deviation, followed by the CNN and the RF results. The regression results demonstrate that the clenching force can be decoded directly, without any raw data processing, from measurements taken by the armband. With the proposed armband, achievable accuracy and correlation for force estimation can be as high as 92% and 96%, respectively. In FIG. 13, a first line chart 1310 shows a first line 1311 representing decoded force and a second line 1312 representing a true force (actual force) in respect of one test subject, and a second line chart 1320 shows a first line 1321 representing decoded force and a second line 1322 representing a true force (actual force) in respect of another test subject.

In summary, the RF, CNN and TMC-ViT models show that measurements taken with the armband can achieve improved average accuracies of 96.64%, 97.18% and 97.86% in estimating wearer intention, respectively. Moreover, the measurements can also be used to achieve an averaged accuracy of 86.05% with a high correlation of 93.55% in estimating grasping force. The sensor device and the armband incorporating the same are advantageous in terms of component complexity, size, weight, portability and cost.

Where in the foregoing description reference has been made to elements or integers having known equivalents, then such equivalents are included as if they were individually set forth.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in a descriptive sense only and not for purposes of limitation, and also the technical scope of the invention is not limited to the embodiments. Furthermore, the present invention is defined not by the detailed description of the invention but by the appended claims, and all differences within the scope will be construed as being comprised in the present disclosure.

Many modifications will be apparent to those skilled in the art without departing from the scope of the present invention as herein described with reference to the accompanying drawings.

The invention claimed is:

1. A sensor device for detecting subcutaneous tissue movement from a skin surface of a user, the sensor device comprising:

an elastic light-transmissive layer having an optical property that changes in response to deformation of the light-transmissive layer, a first light source configured to emit a first incident light through the light-transmissive layer towards the skin surface, a second light source configured to emit a second incident light towards the skin surface, and a photodetector configured to detect a first reflected light, which represents a reflection of the first incident light by a cutaneous tissue layer or at or adjacent a skin surface, and a second reflected light, which represents a reflection of the second incident light by a subcutaneous tissue layer, wherein the photodetector is provided on the light-transmissive layer to detect the first reflected light and second reflected light through the light-transmissive layer, and the second light source is provided on the skin surface of the user and configured to emit the second incident light directly through the skin surface of the user.

2. The sensor device of claim 1, wherein at least a portion of a side of the light-transmissive layer that is configured to contact the skin surface of the user is reflective and configured to reflect light of the first incident light.

3. The sensor device of claim 2, wherein the first light source is provided on the light-transmissive layer to emit the first incident light through the light-transmissive layer.

4. The sensor device of claim 3, wherein the light transmissive layer has a thickness of about 5 mm between the side of the light-transmissive layer that is configured to contact the skin surface of the user and an opposed side at which the first light source is provided, whereby an intensity of the detected first reflection light is increased.

5. The sensor device of claim 1, wherein the light-transmissive layer, first light source, second light source, and photodetector define a sensor module, and the sensor device comprises a plurality of sensor module, each sensor module for use in detecting subcutaneous tissue movement associated with a different muscle group of the user.

6. The sensor device of claim 1, wherein the first incident light has a first wavelength, the second incident light has a second wavelength, and the first wavelength is shorter than the second wavelength.

7. The sensor device of claim 6, wherein the first wavelength ranges from about 500 nm to about 565 nm, and the second wavelength ranges from about 625 nm to about 1,400 nm.

8. The sensor device of claim 1, wherein the light-transmissive layer is configured to resiliently deform, and a deformation of the light-transmissive layer affects one of a path and an intensity of light traversing through the light-transmissive layer.

9. The sensor device of claim 1, wherein the first and second light sources are configured to non-contemporaneously emit the respective first and second incident lights towards the skin surface of the user.

10. The sensor device of claim 1, further comprising at least one of:

a band configured to apply a bias force on the light-transmissive layer against the skin surface of the user, and a processor configured to estimate a subcutaneous tissue movement based on the detected first reflected light and second reflected light.

11. The sensor device of claim 10, wherein the processor is configured to provide values of the detected first reflected light and second reflected light as inputs to a model, and from an output of the model to determine a gestural condition of a body part of the user.

12. The sensor device of claim 1, wherein the first reflected light represents a reflection of the first incident light by a cutaneous tissue layer of tissue, and the cutaneous layer is an epidermis layer.

13. A method of estimating a muscular contraction state of a target muscle using a sensor device of claim 1, the method comprising the steps of:

receiving, using a processor, a sensed value of each of the first reflected light and second reflected light at both a first time point and a second time point, estimating, using the processor, a deformation of a cutaneous region adjacent the skin of a user based on a change in the sensed value of the first reflected light, estimating, using the processor, a deformation of a subcutaneous region adjacent the cutaneous region of the user based on a change in the sensed value of the second reflected light, and estimating, using the processor, muscular contraction state of the target muscle based on the estimated cutaneous deformation and estimated subcutaneous deformation.

14. The method of claim 13, wherein the steps of claim 13 are repeated at different times to provide multiple temporal estimates of the muscular contraction state of the target muscle, and wherein the multiple temporal estimates of muscular contraction state are used to infer a gestural movement of a body part of the user associated with the target muscle.

* * * * *